United States Patent
Acero Acero et al.

(10) Patent No.: US 8,269,149 B2
(45) Date of Patent: Sep. 18, 2012

(54) COOKING DEVICE

(75) Inventors: Jesus Acero Acero, Saragossa (ES);
Rafael Alonso Esteban, Huesca (ES);
Ruben Braulio Martinez, Saragossa (ES); José Miguel Burdio Pinilla, Saragossa (ES); Pablo Jesus Hernandez Blasco, Cuarte de Huerva (ES); Ignacio Millan Serrano, Saragossa (ES); Daniel Palacios Tomas, Saragossa (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 377 days.

(21) Appl. No.: 12/682,051

(22) PCT Filed: Oct. 15, 2008

(86) PCT No.: PCT/EP2008/063894
§ 371 (c)(1),
(2), (4) Date: Apr. 8, 2010

(87) PCT Pub. No.: WO2009/056452
PCT Pub. Date: May 7, 2009

(65) Prior Publication Data
US 2010/0206867 A1    Aug. 19, 2010

(30) Foreign Application Priority Data
Oct. 31, 2007 (ES) .................................. 200702981

(51) Int. Cl.
*H05B 3/68* (2006.01)

(52) U.S. Cl. .................. 219/460.1; 219/443.1; 219/483; 219/622

(58) Field of Classification Search .... 219/443.1–460.2, 219/483, 622
See application file for complete search history.

(56) References Cited

U.S. PATENT DOCUMENTS

| | | | |
|---|---|---|---|
| 2007/0119845 A1* | 5/2007 | Song et al. | 219/460.1 |
| 2010/0176116 A1* | 7/2010 | Lee et al. | 219/460.1 |
| 2011/0017723 A1* | 1/2011 | Kleinhans et al. | 219/492 |
| 2011/0290782 A1* | 12/2011 | Donarski | 219/443.1 |

FOREIGN PATENT DOCUMENTS
EP      0376760 A1     7/1990

* cited by examiner

*Primary Examiner* — Cuong Q Nguyen
(74) *Attorney, Agent, or Firm* — James E. Howard; Andre Pallapies

(57) ABSTRACT

A cooktop includes a plurality of heaters that form a contiguous cooking zone, a power supply for the plurality of heaters with a differentiator that differentiates between a first positive heating power for a first of the plurality of heaters and a second positive heating power for a second of the plurality of heaters in a differentiated heating mode.

15 Claims, 27 Drawing Sheets

COOKING DEVICE

BACKGROUND OF THE INVENTION

A cooking device with a cooktop is known. The cooktop features a contiguous cooking zone consisting of a set of three cooking areas arranged concentrically to one another. In this arrangement a cooking area is assigned one heating unit in each case.

BRIEF SUMMARY OF THE INVENTION

The object of the invention is especially to provide a generic cooking device with improved characteristics in respect of the result of preparing a meal.

The invention is based on a cooking device with at least two heating units which interact to define a contiguous cooking zone of a cooktop and a power device provided for supplying power to the heating units.

The invention proposes that the power device comprises a differentiation unit which, in a differentiated heating mode, is provided for differentiating between a first positive heating power for a first heating unit and a second positive heating power for a second heating unit. This enables advantageous results to be achieved in the preparation of a meal. In particular a distribution of power matched to a geometry of a food preparation vessel can be achieved in cooking areas which span the cooking zone. A heating mode "with" at least two heating units is especially to be understood as an operating mode for heating up a food preparation vessel placed on the cooking zone spanned by the heating units which is executed by at least two heating units. The heating units can be supplied in this operating mode simultaneously and/or successively with heating power. It is advantageous however for the power device to be provided in differentiated heating mode for simultaneous supply of the heating units. In addition heating power "for" a heating unit is to be understood as a heating power output to the heating unit or a heating power to be output to the heating unit. Furthermore a "positive heating power" is to be understood as a heating power which is greater than zero Watts.

In a preferred embodiment of the invention it is proposed that the cooking device features at least three heating units and the differentiated heating mode is a heating mode with at least three heating units, whereby an especially flexible application of a cooking zone spanned by the heating units can be achieved. An especially high flexibility in the adaptation of the operation of the cooking device to the dimensions of a food preparation vessel can be achieved if the cooking device features at least four heating units and the differentiated heating mode is a heating mode with at least four heating units.

It is also proposed that the cooking device features at least three heating units arranged concentrically to each other and that the differentiation unit is provided, in differentiated heating mode, for differentiating between a first positive heating power for a first outer heating unit and a second positive heating power for a second outer heating unit, whereby especially advantageous food preparation results can be achieved.

A "concentric" arrangement of at least two heating units to each other is to be understood in particular as an arrangement of at least two heating units in which a first heating unit at least essentially surrounds a second heating unit. In this case a first heating unit "at least essentially" surrounds a second heating unit when the first heating unit surrounds the second heating unit especially by at least 200°, advantageously by at least 270° and preferably by at least 340°. Advantageously the first heating unit completely surrounds the second heating unit. In a set of concentric heating units a heating unit which at least essentially surrounds at least one further heating unit is designated the "outer" heating unit. A heating unit which is at least essentially surrounded by all further heating units of the set, i.e. which does not essentially surround at least one further heating unit, is called the "central" heating unit. A heating unit which at least essentially surrounds all further heating units of the set, i.e. which is not at least essentially surrounded by a further heating unit, is called the "outermost" heating unit. The heating units in such cases can be circular in shape, spiral in shape, ellipsoid in shape, annular in shape and/or have any other shape that appears sensible to the person skilled in the art. In a concentric arrangement of at least three heating units, an "intermediate" heating unit is especially to be understood as an outer heating unit which is at least essentially surrounded by at least one further heating unit. An intermediate heating unit is at least essentially surrounded by the outermost heating unit.

In a preferred embodiment of the invention it is proposed that the power device is provided to supply an intermediate heating unit by means of the differentiating unit with a smallest possible heating power. This allows an especially favorable temperature distribution to be achieved in the base of a heated food preparation vessel.

In an advantageous development of the invention it is proposed that the power device features a first power unit for supplying at least two heating units and a second power unit different from the first power unit which is provided for supplying at least a third heating unit. By using at least two power units a simultaneous operation of at least two heating units can be achieved especially advantageously, whereby switching operations which are both complex and perceptible during cooking operation can be avoided.

In this context the ease of use can be further increased when the first power unit is provided for simultaneous supply of at least two heating units. A "simultaneous" supply of two heating units is especially to be understood as a supply in which the heating units are supplied in at least one period of time simultaneously with one heating power in each case.

Furthermore it is proposed that the cooking device features at least three heating units arranged concentrically to each other and that the first power unit is provided for supplying at least two outer heating units, whereby a switching topology advantageously adapted to the design of the cooking zone can be achieved.

One embodiment of the differentiated heating mode with a simple topology can be achieved if the first power unit is provided to supply at least two heating units in the differentiated heating mode by means of the differentiation unit with differentiated positive heating power.

In a further embodiment it is proposed that the differentiation unit features at least one switching means which is provided, in differentiated heating mode, to connect at least one of the heating units optionally to the first or to the second power unit, whereby an especially great flexibility and high power values can be achieved.

The first heating power and the second heating power can represent constant power values in differentiated heating mode. In one embodiment of the differentiated heating mode it can be variable over time. In this context it is advantageous for reaching an advantageous temperature distribution for the differentiating unit to have a differentiating means which is provided to predetermine a fixed heating mode between the first and the second heating power at least in the differentiated heating mode. The differentiating means allows a fixed linkage between the first and the second heating power to be achieved. The aim here can be that for a variation over time of the first heating power the second heating power can vary in proportion to the first heating power, with the proportionality factor remaining constant over time.

An especially simple and low-cost embodiment of the differentiating unit can be achieved when the differentiating unit has a differentiating means which is embodied as a capacitor.

A power differentiation can be achieved constructively simply if the differentiation unit has a differentiating means which is connected in differentiated heating mode to at least one heating unit.

A power device with a high application flexibility and a compact construction can be achieved if the differentiation unit features a differentiation means and a switching means which is provided for switching the differentiation means on and off.

Furthermore it is proposed that the differentiation means is arranged in a branch which bridges the switching means, which allows an especially simple embodiment of the differentiation means to be achieved. The differentiation means can be switched off in a simple manner in this way by means of the short-circuit established by the switching means.

It is further of advantage for the differentiation unit to feature at least one further differentiation means which is connected upstream from the switching means, whereby especially advantageous power conditions in the execution of a differentiated heating mode with a high flexibility can be achieved. A differentiation means in this case is connected "upstream" from the switching means if an electric current output supplying a power unit and flowing in the direction of a least one heating unit to be supplied with power reaches the differentiation means before the switching means.

In an advantageous embodiment of the invention it is proposed that the power device features a power unit with a bridge topology and the differentiation unit comprises a differentiation means which is connected in a bridge branch of the power unit, whereby an especially simple circuit topology can be achieved.

An especially advantageous automatic adaptation to the geometry of the food preparation vessel to be heated up can be achieved if the cooking device has a control unit which is provided to actuate the switching on of the differentiated heating mode as a function of a coverage state of at least one heating unit. To this end the cooking device is expediently provided with a sensor means which is effectively connected to the control unit and which is provided for detecting a degree of coverage of at least one heating unit. If the cooking device is equipped with a set of a least three heating units arranged concentrically to each other, the control unit is advantageously provided for actuating the differentiated heating mode as a function of a coverage state of the outermost heating unit.

BRIEF DESCRIPTION OF THE DRAWINGS

Further advantages emerge from the description of the drawings given below. Exemplary embodiments of the invention are shown in the drawing. The drawing, the description and the claims contain numerous features in combination. The person skilled in the art world expediently also consider the features individually and combine them into sensible further combinations.

The drawings show.

DETAILED DESCRIPTION OF EXEMPLARY EMBODIMENTS OF THE PRESENT INVENTION

Figure 1:
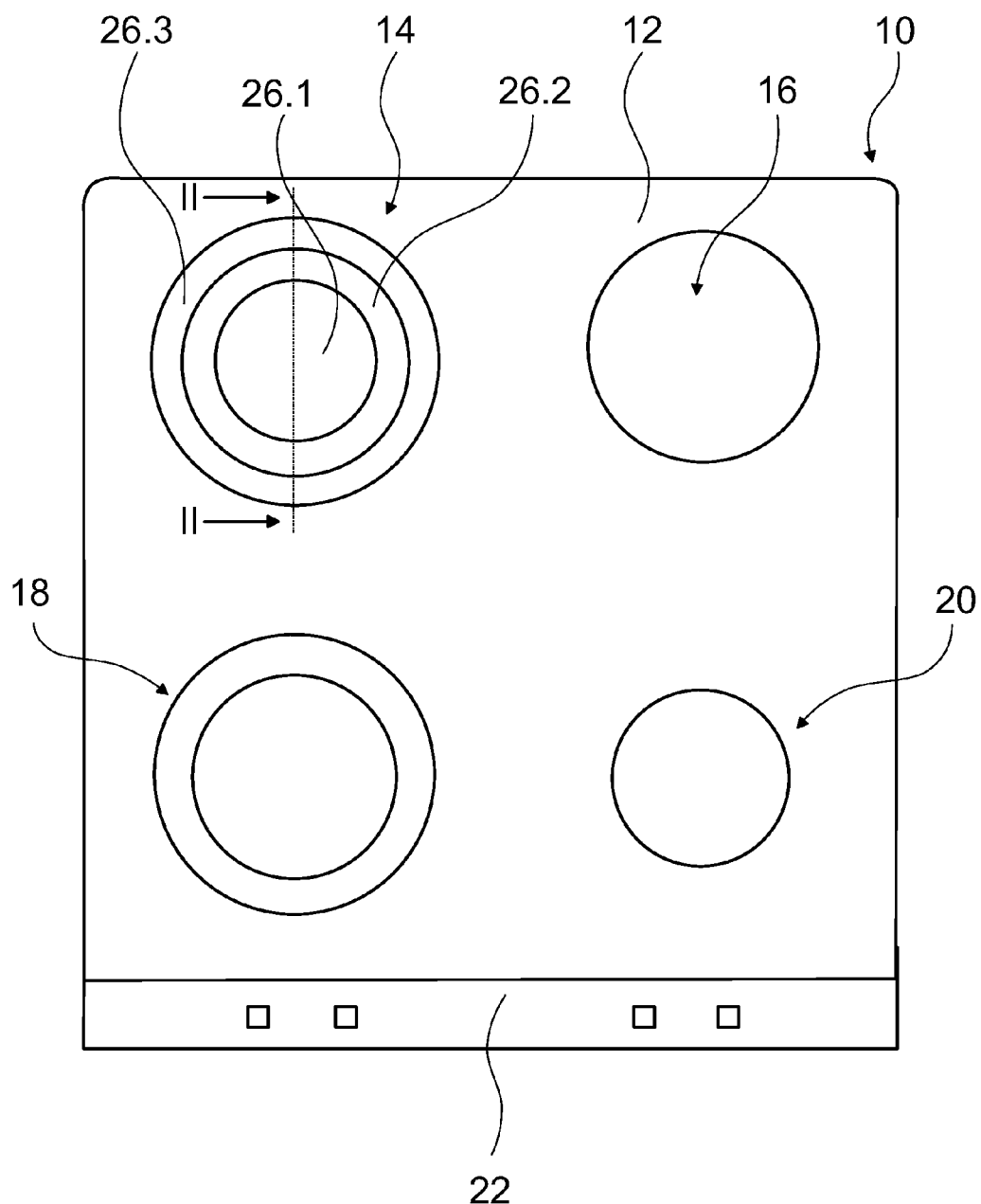
FIG. 1 an induction cooktop with four cooking zones viewed from above.

FIG. 1 shows a cooking device 10 embodied as an induction cooktop in a view from above. This features a cooktop 12 embodied as a ceramic plate on top of which food preparation vessels can be placed. The surface of the cooktop 12 comprises four cooking zones 14, 16, 18, 20 which each correspond to a contiguous subarea of the cooktop suitable to the heating up a food preparation vessel. To this end the cooking zones 14, 16, 18, 20 each cover a least one heating unit of the cooking device 10 in a vertical upwards direction (see FIG. 2).

The cooking zones 14 to 20 are each embodied in a circular shape. The cooking device 10 further features an operator control unit 22 which is provided for starting, stopping and/or adjustment of a heating mode by an operator.

In this text the terms "vertical", "upwards", etc. relate to the position of the cooking device 10 in which it is operated by an end user under the specified usage conditions.

Figure 2:
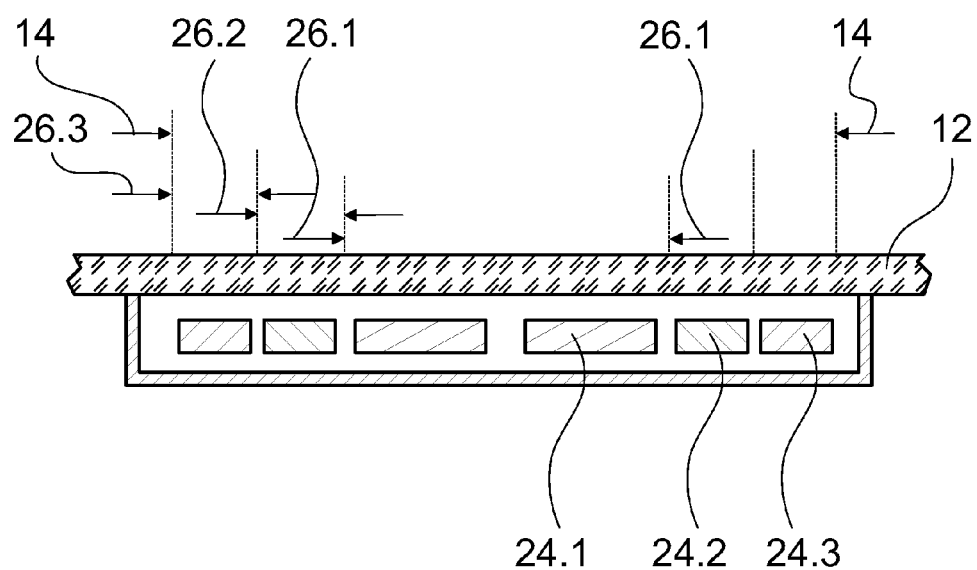
FIG. 2 the induction cooktop in a cross-sectional view.

In FIG. 2 the cooking device 10 is shown in the area of the cooking zone 14 in a cross-sectional view along a line II-II in FIG. 1. The cooking zone 14 covers a set of three heating units 24.1, 24.2, 24.3 in a vertical direction upwards. The heating units 24 are embodied as induction coils in each case which are provided in a known way for exciting resistive losses in the base of a food preparation vessel placed in the cooking zone 14. In an alternate embodiment of the cooking device 10 the heating units 24 can be embodied as a heating resistance in each case. The heating units 24 are arranged concentrically to one another and span the contiguous cooking zone 14. In this case two outer heating units 24.2, 24.3 surround a central heating unit 24.1. An outermost heating unit 24.3 surrounds the central heating unit 24.1 and an intermediate heating unit 24.2 which is arranged in the radial direction of the cooking zone 14 between the central heating unit 24.1 and the outermost heating unit 24.3. The heating units 24 each span a different cooking area 26 of the cooking zone 14. The cooking areas 26 are arranged concentrically to each other. An outermost cooking area 26.3 covers the outer heating unit 24.3 in the vertical direction upwards and surrounds an intermediate cooking area 26.2 and a central cooking area 26.1. The intermediate cooking area covers the intermediate heating unit 24.2 in the vertical direction upwards and surrounds the central cooking area 26.1 which covers the central heating unit 24.1 in the vertical direction upwards. The intermediate cooking area 26.2 is thus arranged in the radial direction of the cooking zone 14 between the central area 26.1 and the outermost cooking area 26.3. The central cooking area, which surrounds the central point of the cooking zone 14, is embodied in a circular shape. The intermediate cooking area 26.2 extends in a ring around the central cooking area 26.1 and the outermost cooking area 26.3 extends in a ring around the intermediate cooking area 26.2 (see also FIG. 1). The cooking areas adjoin each other so that they form a contiguous cooking area 14. In an advantageous embodiment the cooking areas 26 can typically have the following dimensions: The cooking area 26.1 can have a diameter of 210 mm, the cooking areas 26.1 and 26.2 can interact to form a circular cooking zone with a diameter of 260 mm, and the cooking areas 26.1 to 26.3 can interact to correspond to a zone having a diameter of 320 mm.

Figure 3:
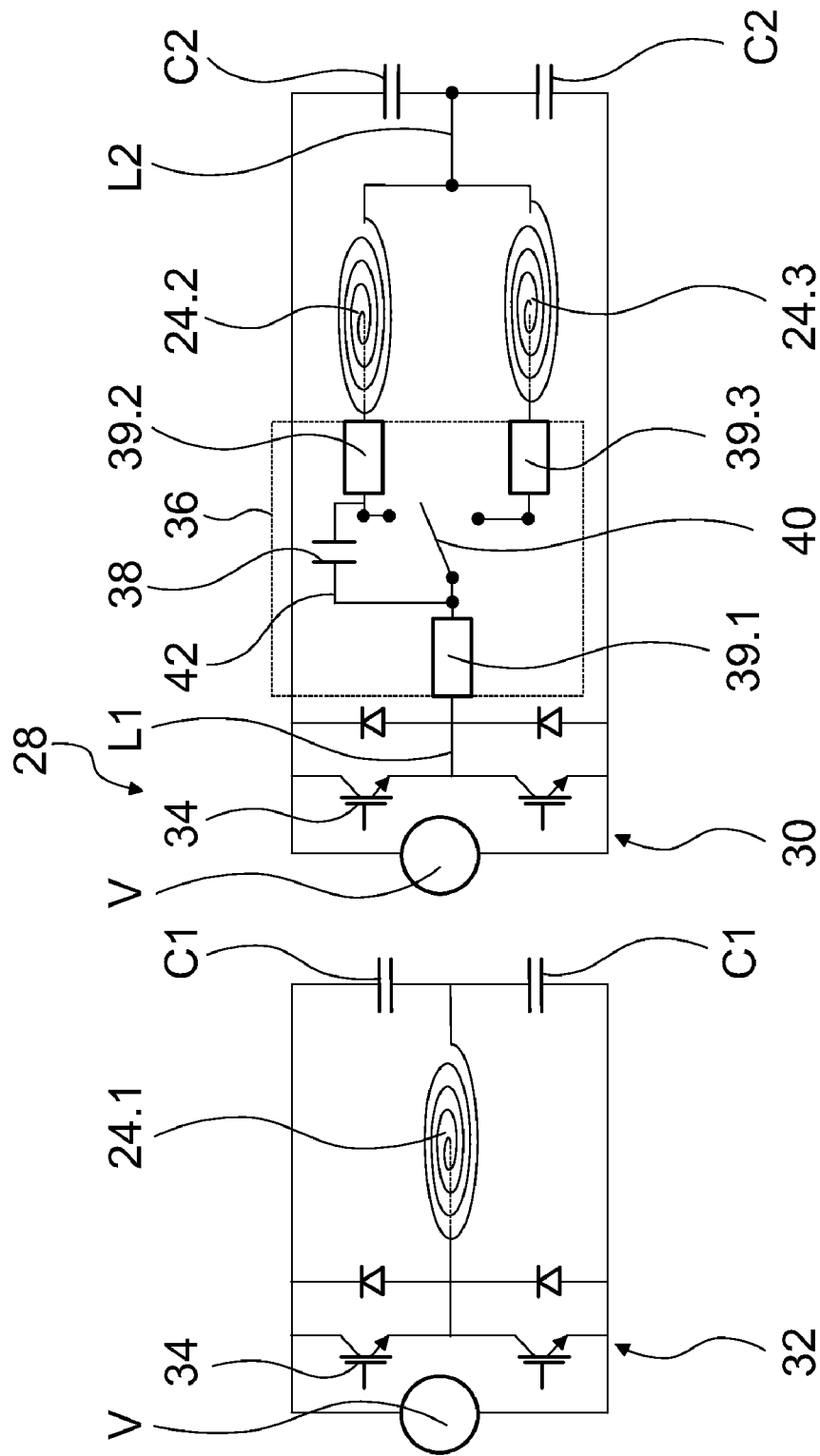
FIG. 3 a circuit of the induction cooktop with heating units, power units and a differentiation unit, FIG. 4a heating operation of a cooking zone with two cooking areas in operation, FIG. 4b the configuration of the circuit from FIG. 3 for heating operation of FIG. 4a, FIG. 4c a food preparation vessel in the cooking zone during heating operation of FIG. 4a, FIG. 5a heating operation of the cooking zone with three cooking areas in operation, FIG. 5b the configuration of the circuit from FIG. 3 for heating operation of FIG. 5a, FIG. 5c a food preparation vessel in the cooking zone during heating operation of FIG. 5a, FIG. 6 a control unit, a sensor means and a switching means of the induction cooktop, FIG. 7 a particular embodiment of the circuit from FIG. 3, FIG. 8 a further embodiment of the circuit from FIG. 3 with a capacitor connected upstream from two heating units, FIG. 9 an alternate circuit from the embodiment depicted in FIG. 3 with an optionally switchable capacitor connected downstream from a heating unit to reduce the power of the heating unit, FIG. 10 the circuit from FIG. 3 with a capacitor connected downstream from further heating unit, FIG. 11 a further variant of the circuit from FIG. 3, FIG. 12 a further embodiment with a differentiation unit which is equipped with two relays, FIG. 13 a further embodiment with a differentiation unit which is equipped with three relays, FIG. 14 a further embodiment with an optional connection of two power units, FIG. 15 an embodiment variant of the circuit from FIG. 14 with different branching points, FIG. 16 an embodiment variant of the circuit from FIG. 14 with three relays, FIG. 17 a further embodiment of variant of a connected topology, FIG. 18 a further embodiment variant of a connected topology for executing a nominal heating mode, FIG. 19 the embodiment from FIG. 18 during the execution of a "superboost" heating mode, in which a connection is established to further power units, FIG. 20 an embodiment of variant of the topology from FIG. 18 with an additional relay, FIG. 21 a cooking zone with four concentric cooking areas, FIG. 22 a circuit of the induction cooktop with four heating units which are assigned to the cooking areas with a topology in accordance with the embodiment from FIG. 3, FIG. 23 the circuit from FIG. 22 with a topology in accordance with the embodiment from FIG. 11, FIG. 24 the circuit from FIG. 22 with a topology in accordance with the embodiment from FIG. 12 and FIG. 25 the circuit from FIG. 22 with a topology in accordance with the embodiment from FIG. 13.

FIG. 3 shows a circuit of the cooking device 10. This circuit features the heating units 24.1, 24.2, 24.3 and a power device 28 which is provided for supplying power to the heating units 24. The power device 28 has two power units 30, 32 which are each embodied as converters. In this case the power units 30, 32 each feature switching elements 34 embodied as transistors which in the known manner, starting from the basis of a rectified voltage, identified in the drawings by the reference letter V, create an alternating current for feeding the heating units 24. The switching elements 34 are embodied for example as IGBTs (Insulated Gate Bipolar Transistors). Further switching elements 34 which would appear sensible to the person skilled in the art are conceivable. A first power unit 30 is provided for supplying power to the outer heating units 24.2 and 24.3. The power unit 30 and the heating units 24.2, 24.3 are arranged in a bridge topology, with the heating units 24.2 and 24.3 in a common bridge branch. In addition to the power unit and embodied separately from the power unit 30 is a power unit 32 for supplying power to the central heating unit 24.1. The power device 28 features a differentiating unit 36, the functioning of which is described below in greater detail. The differentiating unit 36 features a differentiating means embodied as a capacitor 38. Furthermore the differentiation unit 36 can optionally feature a further differentiating means unit 39 which is depicted schematically in FIG. 3 by means of a rectangle. A rectangle represents an impedance value in each case which can take the form of a further capacitor, an inductance, a resistor or a combination of the above. Two particular embodiments of the circuit from FIG. 3 are presented in FIGS. 7 and 8. As can be seen by comparing FIGS. 3 and 7, a rectangle in FIG. 3 can also represent a short circuit. The power unit 30, the differentiating unit 36 and the heating units 24.2, 24.3 are arranged in a bridge topology. The heating units 24.2, 24.3 and the differentiating unit 36 are arranged in a bridge branch of the bridge topology. The bridge branch features a central line L1 which adjoins the power unit between two switching elements 34. The central line L1 divides into two parallel branches in which one of the heating units 24.2, 24.3 is arranged in each case. The parallel branches join to form a central line L2 which adjoins a capacitor branch between two capacitors C2 which are connected to the switching elements 34. The differentiating unit 36 further comprises a switching means 40 which can for example be embodied as a relay and which serves optionally to connect the central line L1 to one of the parallel branches of the bridge branch. The differentiating means 38 embodied as a capacitor is arranged in a branch which connects the central line L1 to the branch in which the heating unit 24.2 is arranged and in doing so bridges the switching means 40, so that the central line L1 is permanently connected electrically to this branch via the differentiating means 38. The power unit 32 and the heating unit 24.1 are likewise arranged in a bridge topology with a bridge branch in which the heating unit 24.1 is switched. The bridge branch adjoins the power unit 32 between two switching elements 34 and a capacitor branch between two capacitors C1 which are connected to the switching elements 34.

At least two heating modes for operating the cooking zone 14 can be implemented by means of the power device 28 and especially by the switching means 40 of the differentiating unit 36. This will be described with reference to FIGS. 4a, 4b, 5a and 5b.

Figure 4A:
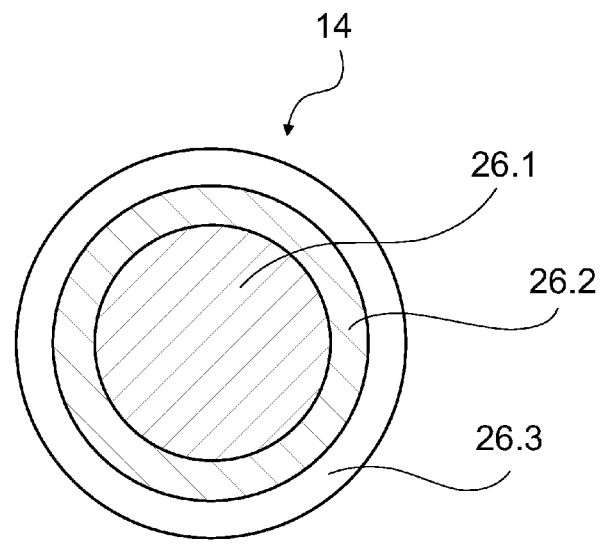
Figure 4B:
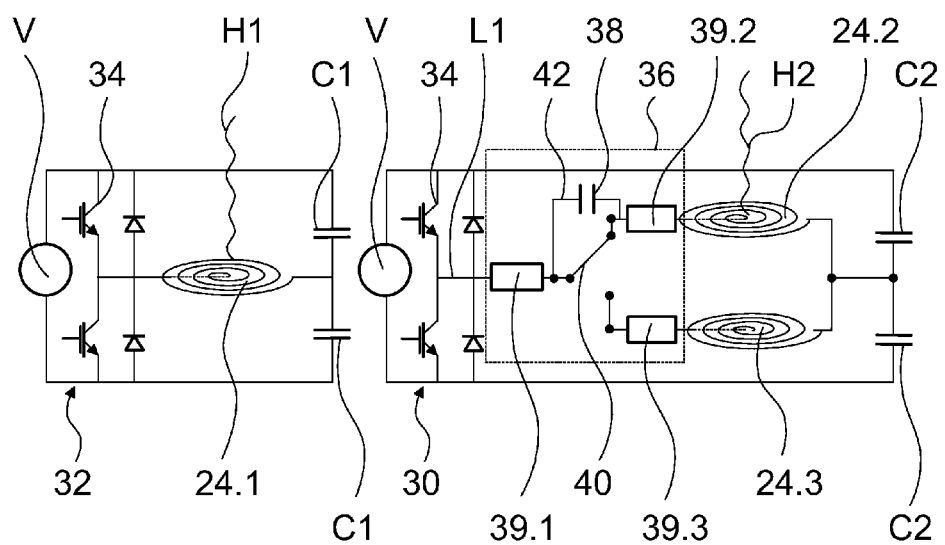
Figure 5A:
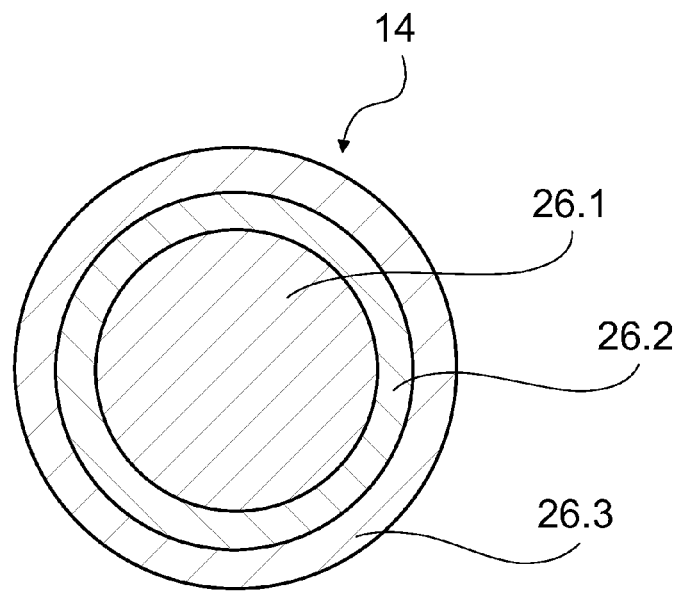

In a first heating mode the central heating unit 24.1 and the intermediate heating unit 24.2 are supplied simultaneously with heating power. In this case the central heating unit 24.1 will be supplied by means of the power unit 32 with a first positive heating power H1. The intermediate heating unit 24.2 is supplied by means of the power unit 30 with a heating power H2 while the heating unit 24.3 remains unoperated. This is shown in FIGS. 4a and 4b. In FIGS. 4a and 5a a cross-hatched cooking area corresponds in each case to a heating area which covers an operated heating unit. In this case the switching means 40, which is embodied as a relay for example, is brought into a switching position shown in FIG. 4b in which a circuit exclusively including the heating unit 24.2 is closed. This is formed by the heating unit 24.2, one of the capacitors C2, a switching element 34 and where necessary by a further differentiating means 39.1 and/or 39.2. The connection established between the central line L1 to the branch of heating unit 24.2 by the switching means 40 represents a short circuit relative to the branch 42, so that electrical current flows exclusively through the switching means 40 into the heating unit 24.2 or out of the heating unit 24.2. The differentiation means 38 in this case is in a switched-off state. In the switching position of the switching means 40 shown in FIG. 4b a circuit including the outermost heating unit 24.3 is also opened, which means that the heating unit 24.3 is in an unoperated state.

Figure 5B:
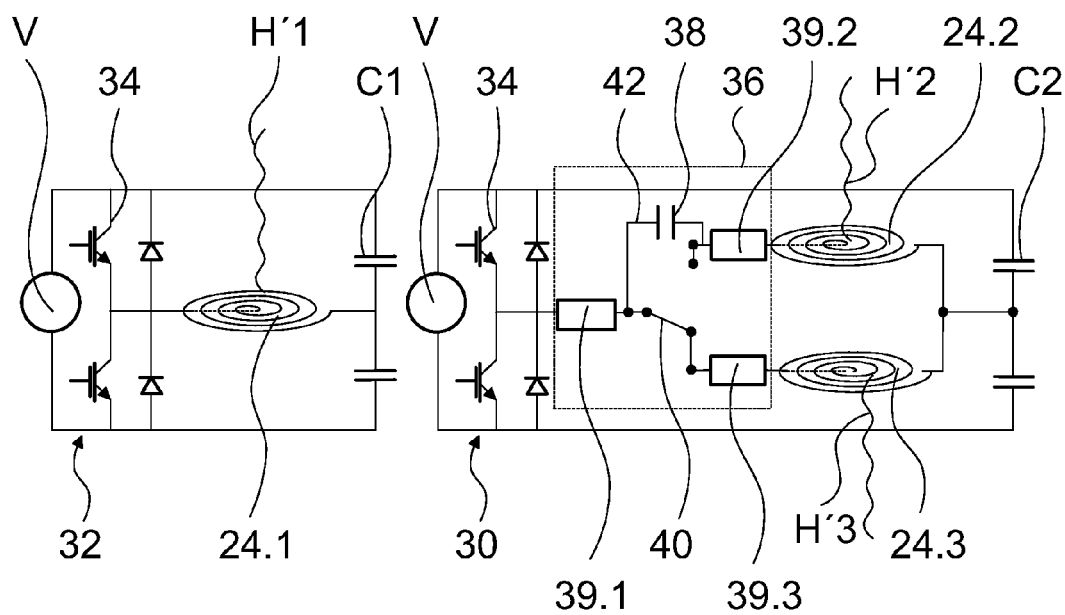

A second heating mode, also referred to below as differentiated heating mode, is described with reference to FIGS. 5a and 5b. As emerges from FIG. 5a, the differentiated heating mode corresponds to a heating mode with the three heating units 24.1 to 24.3. In differentiated heating mode the heating units 24.1 to 24.3 are supplied simultaneously with heating power. The power unit 32 creates a positive heating power H'1 for the central heating unit 24.1. In differentiated heating mode the outer heating units, and indeed the intermediate heating unit 24.2 and the outermost heating unit 24.3, are supplied jointly and simultaneously by the power unit 30 with heating power. The intermediate heating unit 24.2 is supplied with a positive heating power H'2 and the outermost heating unit 24.3 is supplied with a positive heating power H'3. In the switching position of the switching means 40 shown in FIG. 5b the differentiating means 38 is in a switched-on state by being switched via the branch 42 in series with the heating unit 24.2. As emerges from a comparison between FIGS. 4b and 5b, the switching means 40 serves to switch between a first topology in which the differentiation means 38 is switched off and a second topology in which the differentiation means 38 is switched on. In the configuration of FIG. 5b the switching means 40 closes a circuit arranged in the bridge branch featuring the differentiation means 38 and the heating units 24.2, 24.3.

In the execution of the differentiated heating mode the differentiation means 38 of the differentiation unit 36 serves to differentiate the positive heating powers H'2 and H'3 from each other. In particular the power device 28 is provided for supplying the intermediate heating unit 24.2 by means of the differentiation unit 36 with a smaller heating power H'2 compared to the heating power H'3: With the aid of the differentiation means 38 which is embodied in differentiated heating mode as a capacitor switched in series with the heating unit 24.2, the intermediate heating unit 24.2 will be supplied with the heating power H'2 which is smaller than the heating power H'3 with which the outermost heating unit 24.3 will be supplied. The differentiation means 38 in this case specifies a ratio between the heating power H'3 of the outermost heating unit 24.3 and the heating power H'2 of the intermediate heating unit, which remains fixed during execution of the differentiated heating mode. This ratio can further be fixed by selecting the impedance values of the further differentiating means 39. The ratio remains in existence during the execution of the differentiated heating mode and does so independently of the specified overall power of the power unit 30. In an alternate embodiment variant it is conceivable for the differentiation unit 36 to feature a differentiation means 38 which is embodied as a variable capacitor.

Figure 4C:
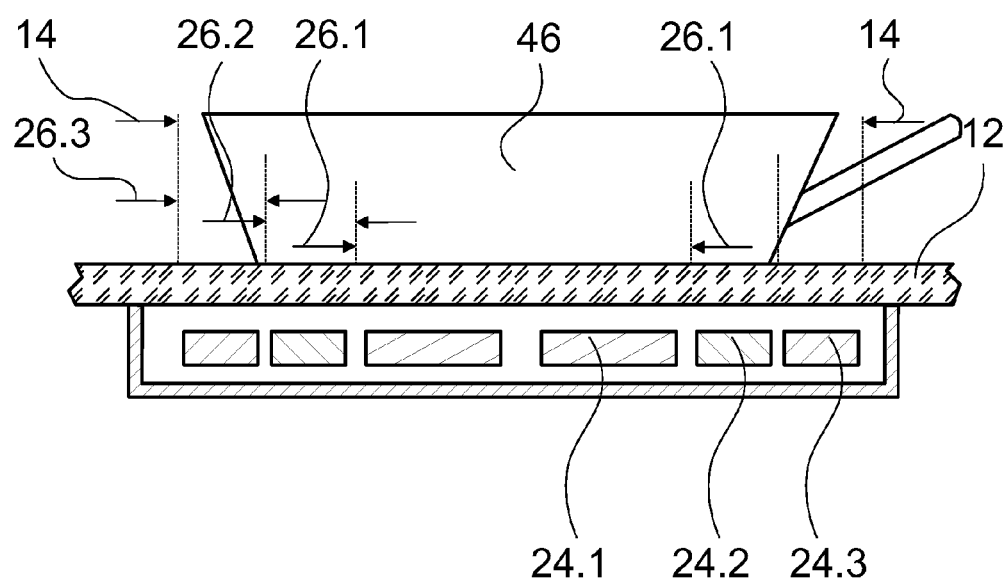
Figure 5C:
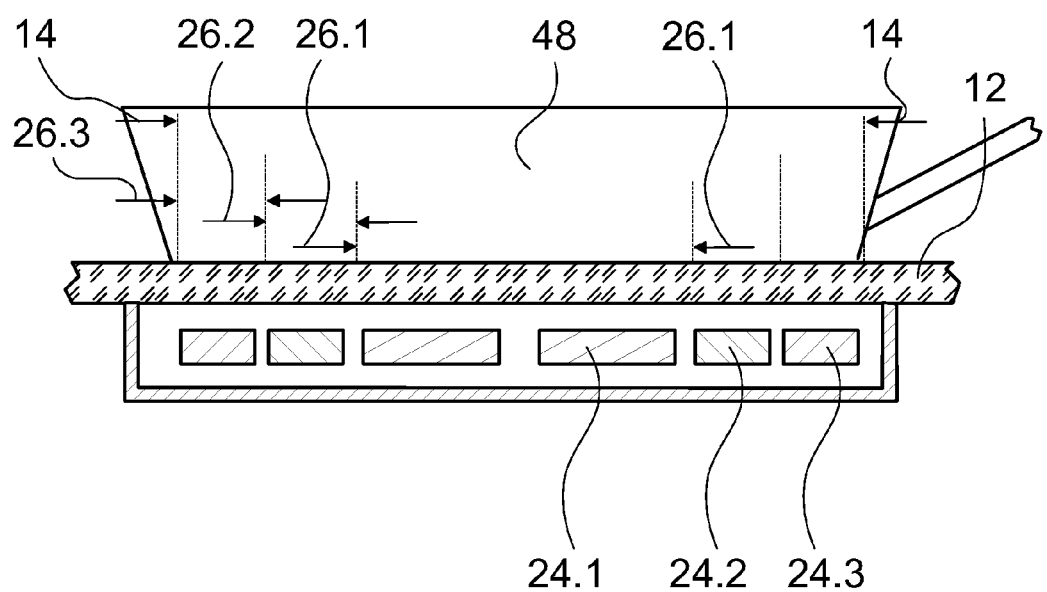

FIGS. 4c and 5c correspond to the cross-sectional view of FIG. 2 with a food preparation vessel 46 (FIG. 4c) or 48 (FIG. 5c) respectively being placed in the cooking zone 14. As emerges from these figures, the heating modes described above are suitable for heating up food preparation vessels of different dimensions. In the example of FIG. 4c a food preparation vessel 46 is placed in the cooking zone 14 with the base of the food preparation vessel covering the central cooking area 26.1 and the intermediate cooking area 26.2 and the power device being operated in first heating mode. In the example in FIG. 5c the base of a food preparation vessel 48 covers the three cooking areas 26.1 to 26.3, with the power device 28 being operated in differentiated heating mode with three heating units 24.1 to 24.3.

Figure 6:
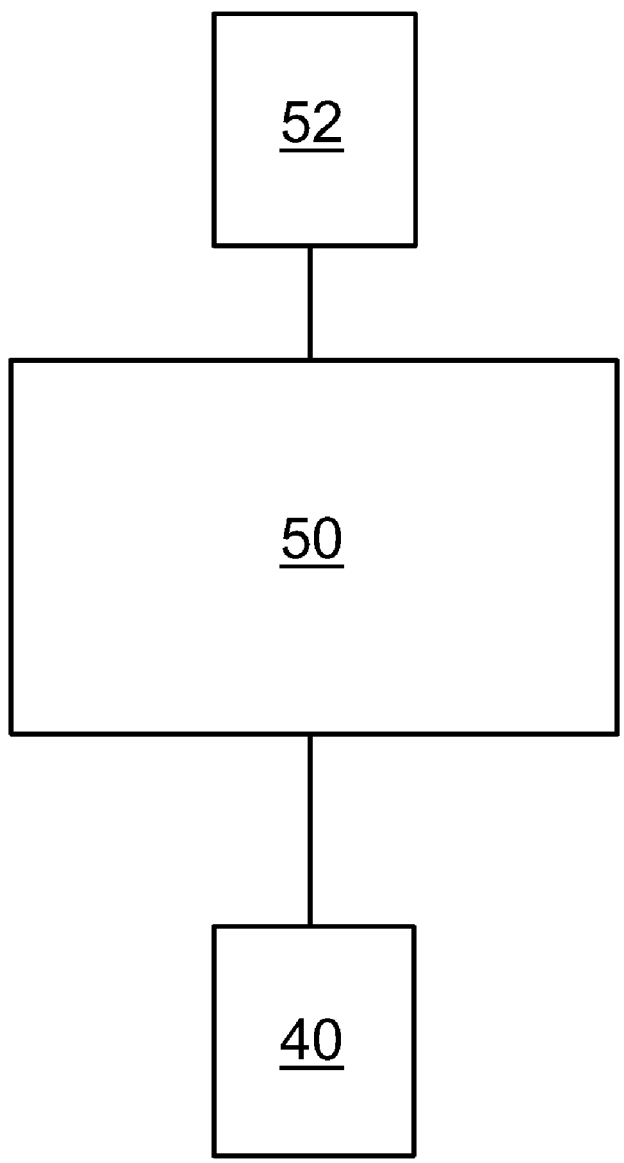

The differentiated heating mode is switched on as a function of the state of coverage of the outermost heating unit 24.3. This is described with reference to FIG. 6. FIG. 6 shows a circuit of the cooking device 10 in a schematic view. The differentiated heating mode is switched on by means of a control unit 50 which is effectively connected to the switching means 40 of the differentiation unit 36. The control unit 50 is a further effectively connected to the sensor means 52 which is intended to detect a degree of coverage of a heating unit and in this example especially the outermost heating unit 24.3. The sensor means 52 can be an inductive means for example. In particular the sensor means 52 can correspond to the heating unit 24.3 embodied as an induction coil. In this case a check can be made by means of a magnetic field excited by the heating unit 24.3 as to whether the cooking area 26.3 is covered by a food preparation vessel suitable for inductive cooking operation. If this is detected, a control signal is transmitted to the switching means 40 from the control unit 50 which actuates the switching means 40. In this case the switching means 40 is placed in the switching position shown in FIG. 5b, in which the differentiation means 38 is switched on and the heating units 24.2, 24.3 are each operated with a different heating power. The fact that in differentiated heating mode the intermediate heating unit 24.3 is operated with a smaller heating power H'2 than the heating power H'3 of the outermost heating unit 24.3 enables a uniform temperature distribution to be achieved in the preparation vessel base of the food preparation vessel 48. This is attributable to the fact that the outer edge of the food preparation vessel 48 has a heatsink whereby the edge area of the food preparation vessel 48 needs a greater heating power than the intermediate area. In differentiated heating mode the outermost heating unit 24.3 and the central heating unit 24.1 can be operated with an equivalent heating power H'1=H'3.

FIGS. 7 to 24 show embodiments of circuits of the cooking device 10 which serve to supply the heating units 24. Basically the description of FIGS. 1 to 7 applies to these further embodiments. To avoid repetitions only the differences from the embodiment depicted in FIG. 3 will be described below. No new reference signs are allocated to components which remain the same.

Figure 7:
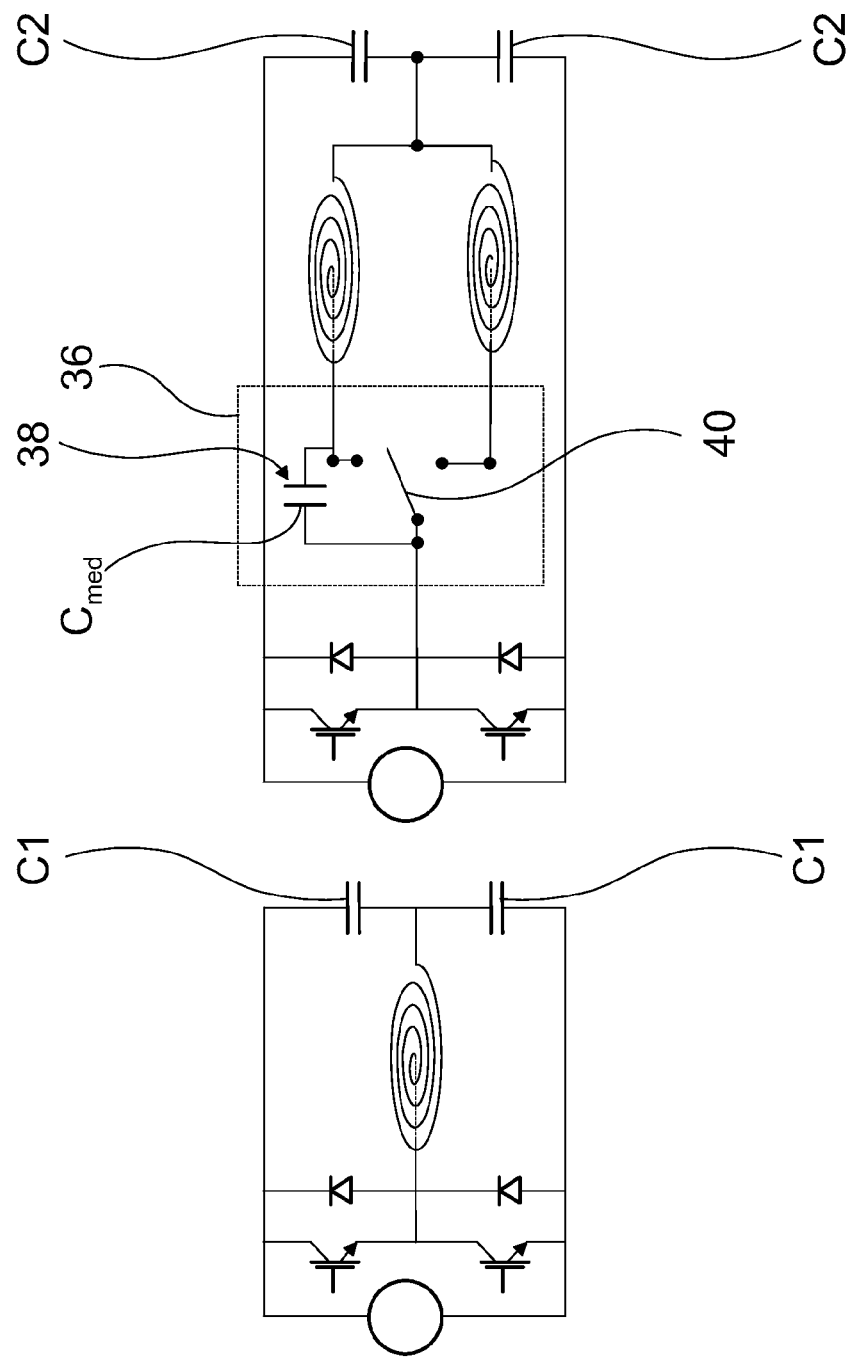

FIG. 7 shows a specific embodiment of the circuit from FIG. 3. In this embodiment the differentiation unit 36 exclusively comprises the differentiation means 38 which is also labeled as capacitor $C_{med}$, and the switching means 40. Typically the following values for the individual function components are conceivable: C1=720 nF, C2=720 nF and $C_{med}$=90 nF. In the example considered the intermediate heating unit 24.2 is supplied by means of the differentiation means 38 with the heating power H'2 which corresponds to 30% of the entire heating power created by the power unit 31 while the outermost heating unit 24.3 is supplied with the heating power H'3, which corresponds to 70% of the overall heating power created by the power unit 30. Further values of the heating powers H'2 and H'3 which appear sensible to the person skilled in the art are conceivable.

Figure 8:
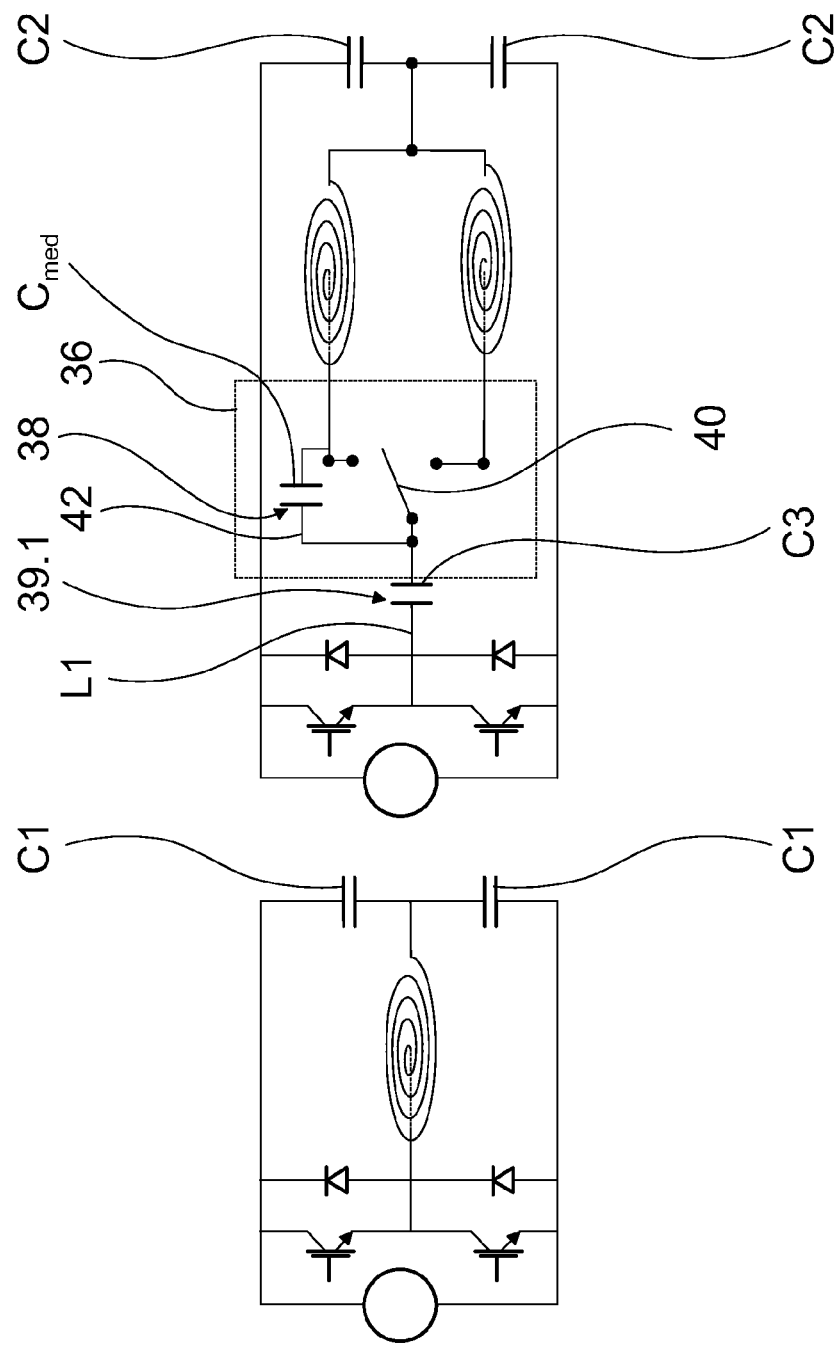

FIG. 8 shows a further embodiment of the circuit from FIG. 3. In this figure the differentiation means 39.1 which is connected upstream from the switching means 40 in the bridge branch and especially in the central line L1 and in series with the parallel branches of the heating units 24.2, 24.3, is embodied as a capacitor C3. The following configuration of the circuit is conceivable: C1=720 nF, C2=720 nF, $C_{med}$=90 nF and C3=1440 nF. Here and in the text as a whole the terms "upstream" and "downstream" relate to a direction which is specified by a current flow in the bridge branch starting from the switching elements 34 and moving in the direction towards the capacitors C2. The differentiation means 39.1 is arranged before the branching point of the branch 42 so that it is assigned to both heating units 24.2, 24.3 while the differentiation means 38 which is arranged in the branch 42 is assigned to the heating unit 24.2.

Figure 9:
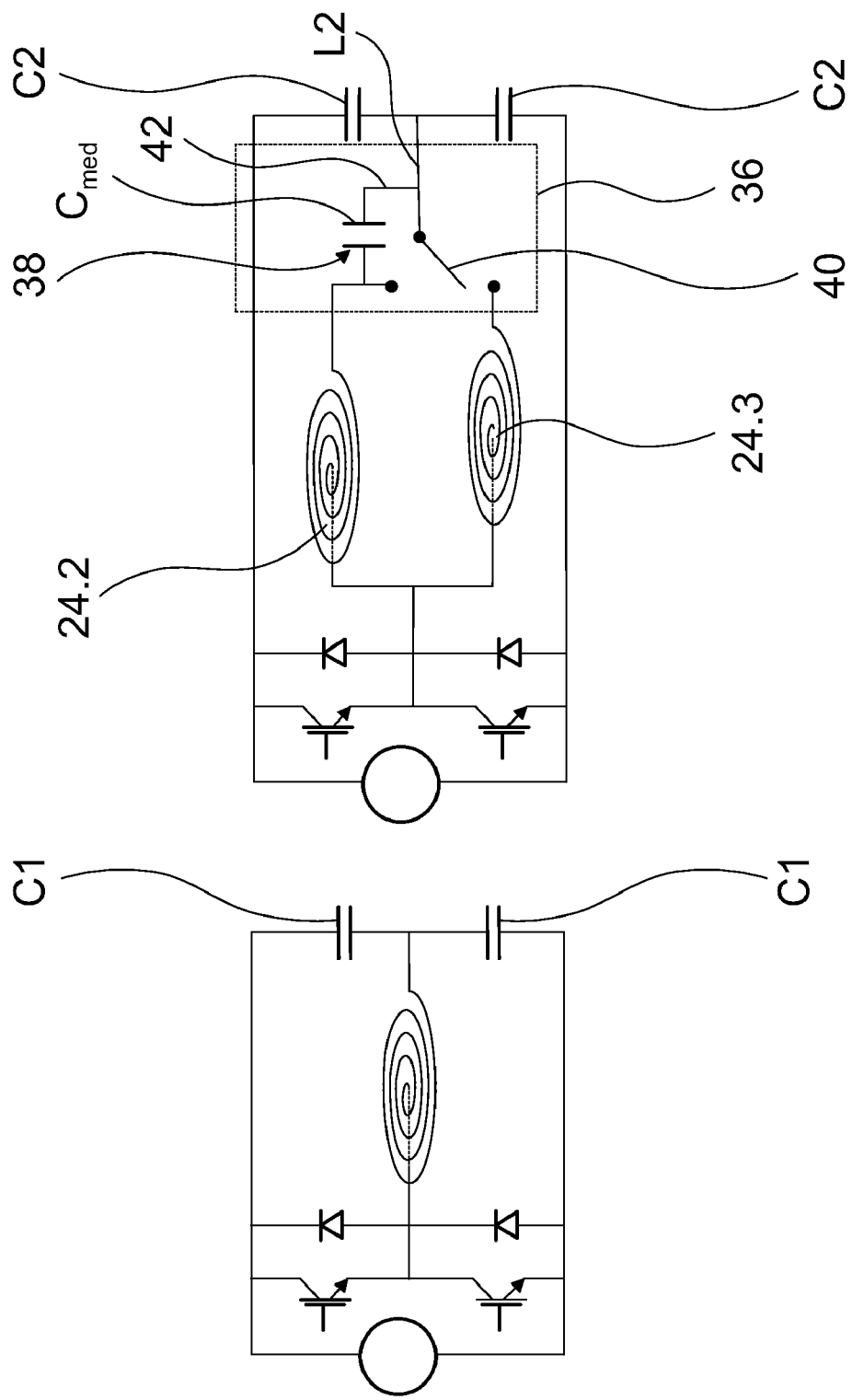

FIG. 9 shows an alternative embodiment of the circuit of the cooking device 10. Compared to the embodiment from FIG. 7 the differentiation unit 36 is connected downstream from the heating units 24.2, 24.3. In this case the differentiation unit 36 adjoins the central line L2 and it is arranged between the parallel branches with the heating units 24.2, 24.3 and the capacitor branch with the capacitors C2. The branch 42 connects the branch of the heating unit 24.2 directly to the central line L2 and bridges the switching means 40.

Figure 10:
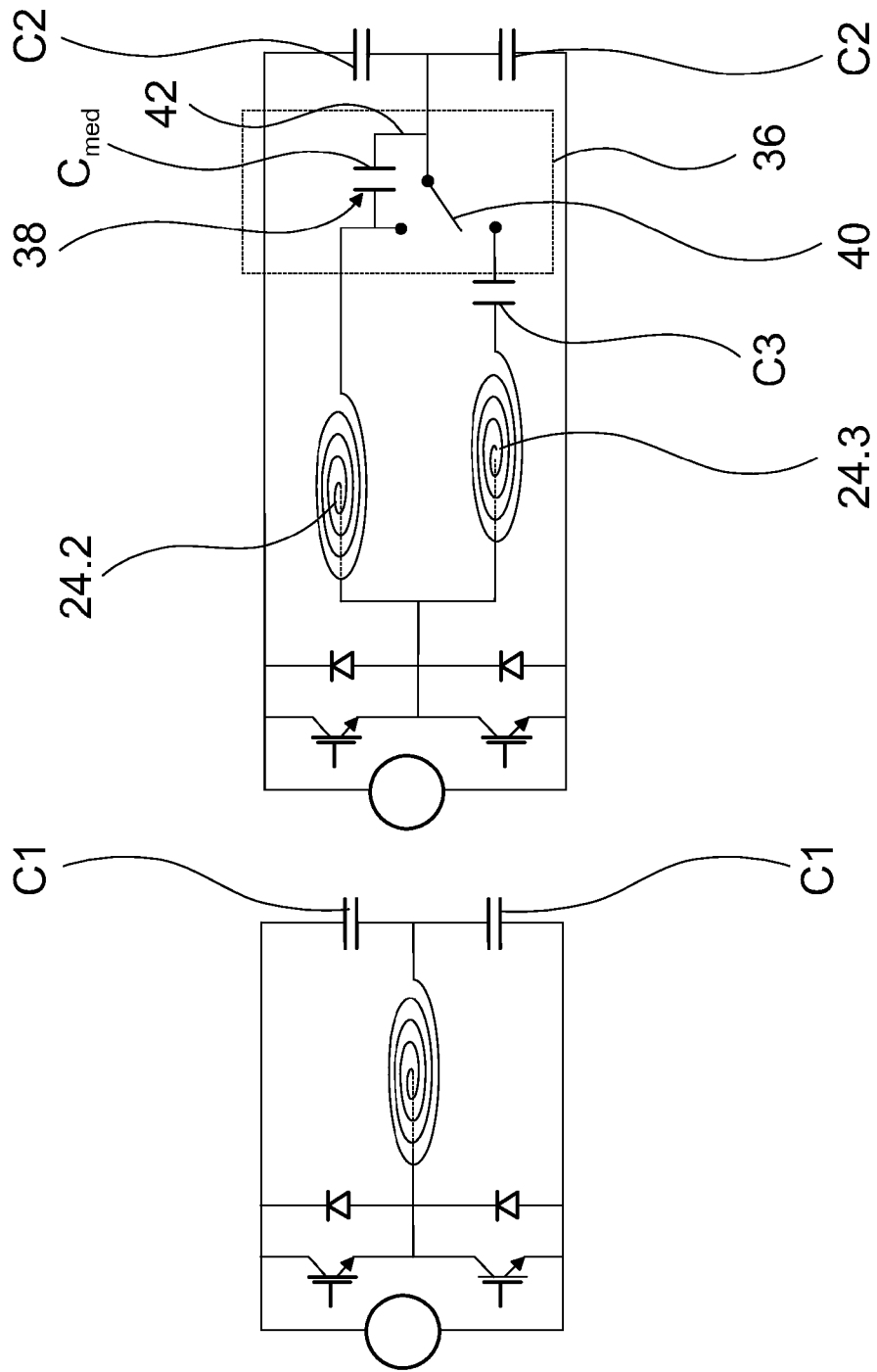

FIG. 10 shows a further embodiment of the circuits in which the differentiation unit 36, as in FIG. 9, is likewise connected downstream from the heating units 24.2, 24.3. By comparison with FIG. 9 the differentiation unit additionally features a differentiation means embodied as a capacitor C3. This is arranged in the parallel branch which is assigned to the heating unit 24.3 and is connected downstream from the heating unit 24.3. In this example the following values of the individual function modules are advantageous: C1=720 nF, $C_{med}$=90 nF, C2=540 nF and C3=1080 nF.

Figure 11:
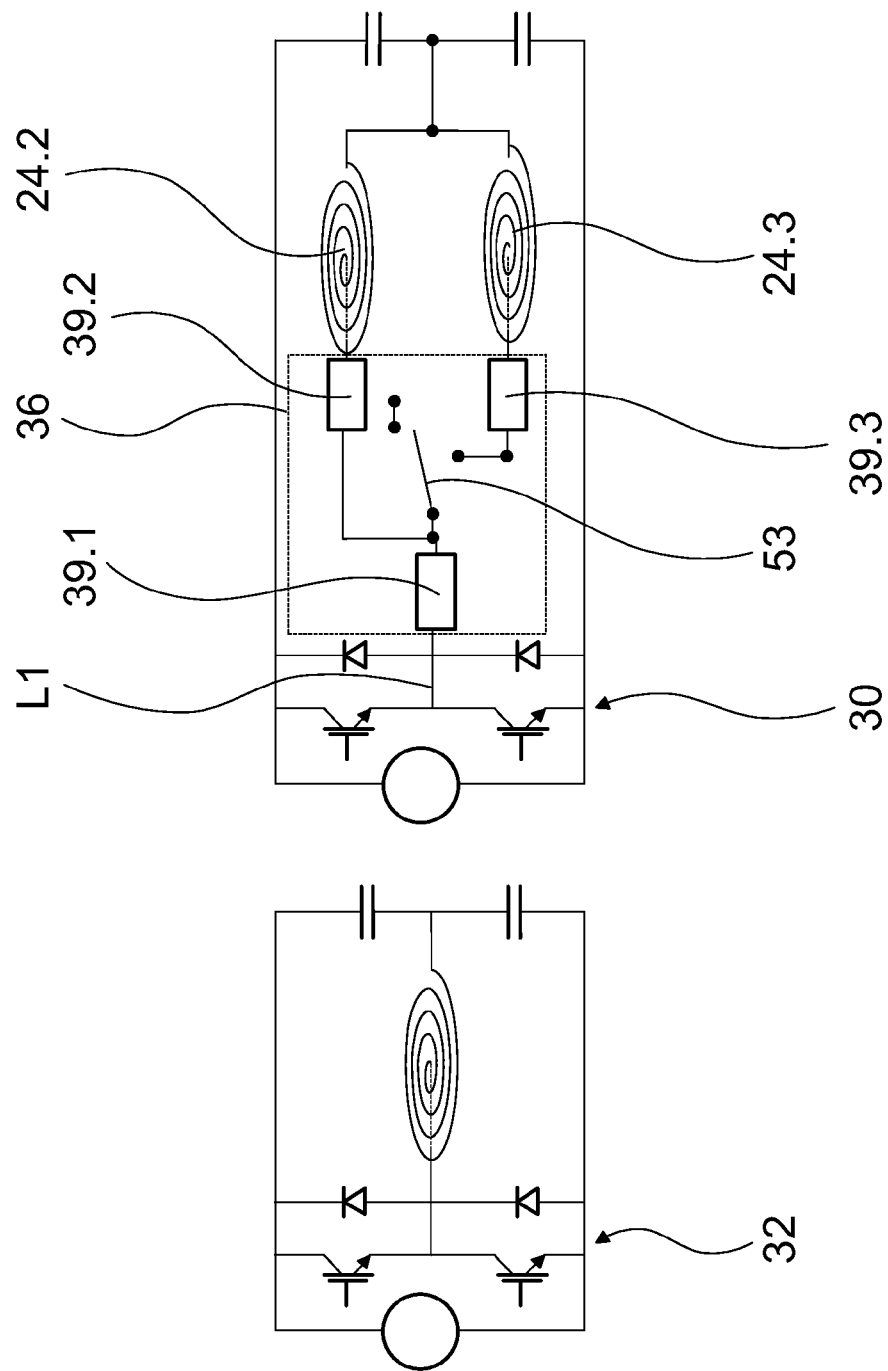

FIG. 11 shows a further embodiment of the circuit. In this diagram the differentiation unit 36 corresponds to the embodiment depicted in FIG. 3, with the difference that the differentiation means 38 is dispensed with. In the example shown the branch of the heating unit 24.2 is connected permanently to the central line L1 and is electrically connected thereby to the power unit 30. The differentiation unit 36 in the embodiment shown features a switching means 53 which is arranged in the branch assigned to the heating unit 24.3 and is used for switching on and switching off the heating unit 24.3. The switching means 53, which can be embodied as a relay for example, is arranged after the branching point of the branch assigned to the heating unit 24.2 so that this branch is permanently connected to the line L1 and thereby to the power unit 30. The ratio of the heating powers H'2 and H'3 in differentiated heating mode of the heating units 24.2 and 24.3 is produced by the choice of the values of the differentiation means 39.1, 39.2, 39.3. In this case these values are selected such that the heating power H'2 in differentiated heating mode is smaller than the heating power H'3.

Figure 12:
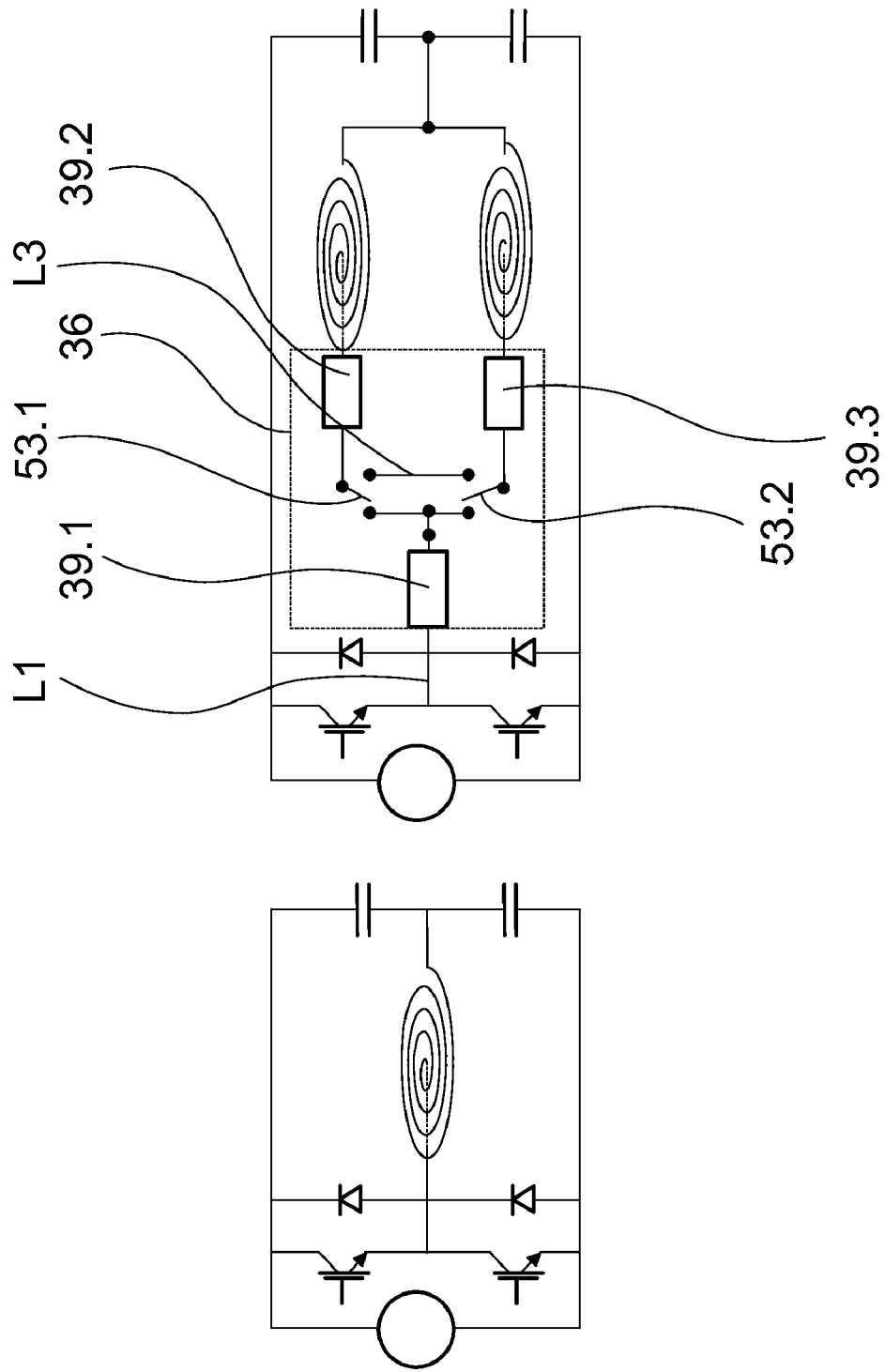

Furthermore a further embodiment is conceivable which is depicted in FIG. 12. This corresponds to the embodiment from FIG. 11 with the difference that in the branch assigned to the heating unit 24.2 a switching means 53.1 likewise embodied as a relay is arranged. The switching means which serves for switching the heating unit 24.3 on and off and can already be seen in FIG. 11 is identified here by the reference number 53.2. The switching means 53.1, 53.2 serve to disconnect the heating units 24.1, 24.2 from the central line L1. Furthermore a connecting line L3 is provided which serves to connect the heating units 24.2, 24.3 in series with one another when both heating units 24.2, 24.3 are disconnected from the central line L1. As in the embodiment from FIG. 11 the ratio of the heating power H'2 and H'3 in differentiated heating mode is provided by the dimensioning of the differentiation means 39.1 to 39.3.

Figure 13:
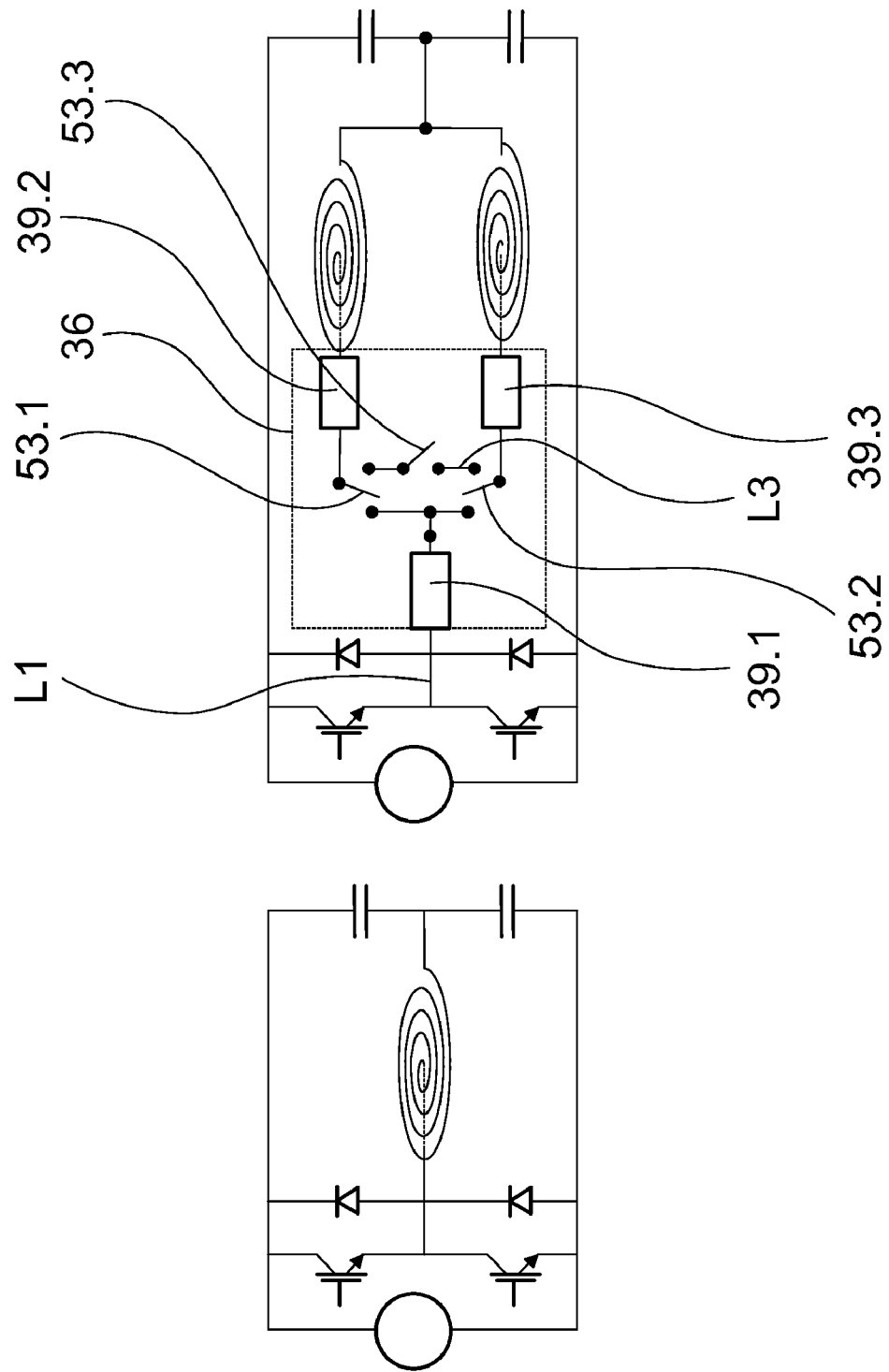

FIG. 13 shows a further embodiment of the circuit which essentially corresponds to the embodiment from FIG. 12. In addition a further switching means 53.3 is provided in the connecting line L3 which serves optionally to interrupt the connecting line L3.

FIGS. 14 to 20 show further embodiments of a circuit for the cooking device 10 in which the power units 30 and 32 are connected to one another.

Figure 14:
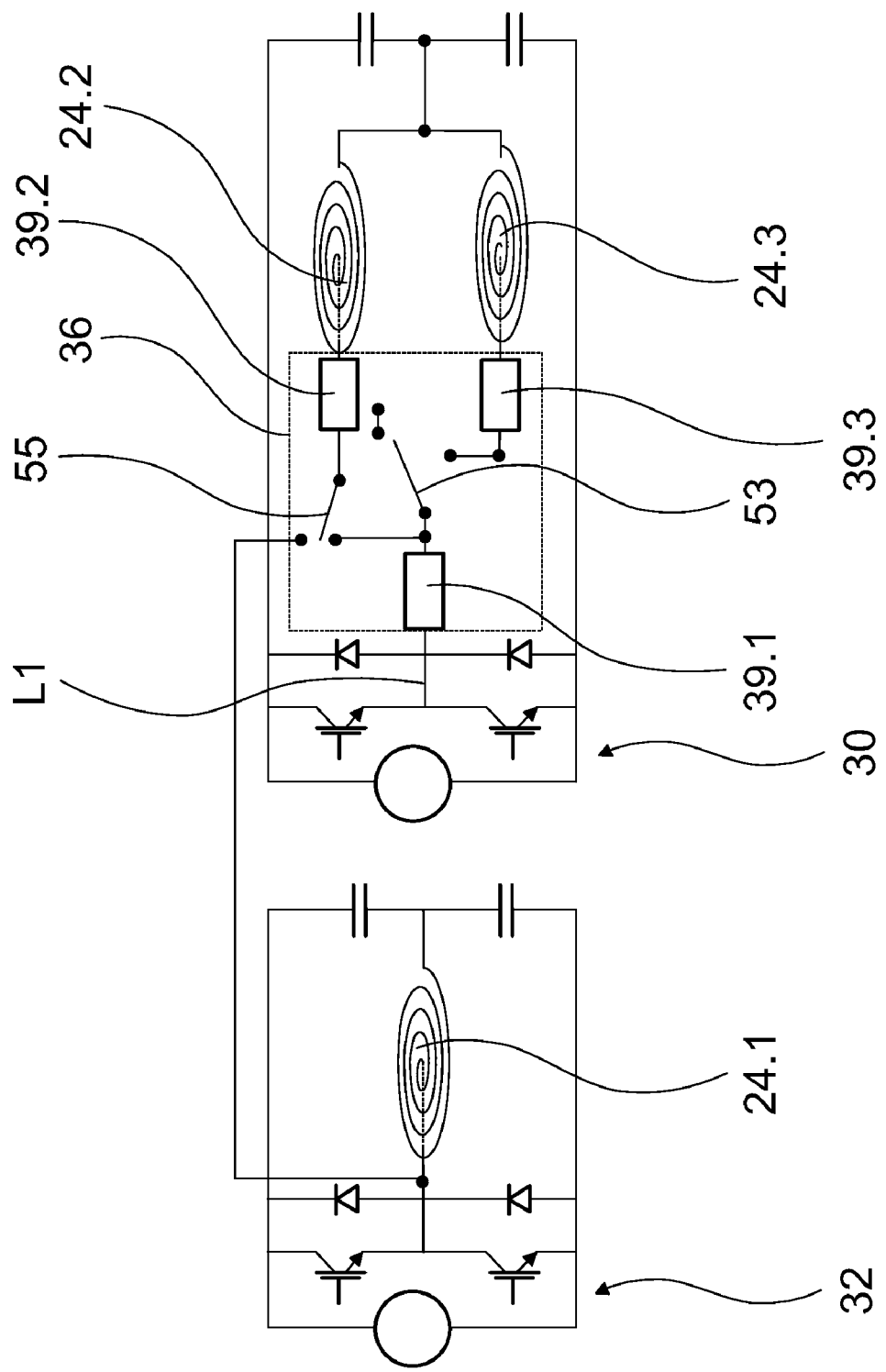

The embodiment in accordance with FIG. 14 essentially corresponds to the embodiment from FIG. 11. In the example shown the distinguishing characteristic of the circuit is that, in the branch assigned to the heating unit 24.3, a further switching means of the differentiation unit 36, e.g. in the form of a relay, is arranged. This switching means is labeled with the number 55 in the figure while the other switching means which is arranged as in FIG. 11 in the branch assigned to the heating unit 24.3 is still labeled with the reference number 53. The switching means 55 is used to switch between a first configuration in which the heating unit 24.2 is connected to the central line L1 and a second configuration in which the heating unit 24.2 is connected to the power unit 32. The connection of the power unit 32 is made via a line which is branched off from the bridge branch in which the heating unit 24.1 is arranged, with the branching point being upstream from the heating unit 24.1. The differentiation in the heating powers H'2 and H'3 in the differentiated heating mode can, as described above, be defined by the choice of the dimensioning of the differentiation means 39. Furthermore, as an alternative or in addition, the differentiation can also be achieved by the heating units 24.2 and 24.3 being supplied by a different power unit 32 or 30 with power, with the units 30, 32 typically having a different nominal power. This principle of differentiation with the aid of explicitly dimensioned differentiation means 39 and/or switching means 55 for optional connection of a least one heating unit 24.2 and/or 24.3 to different power units 30, 32 can be implemented with different topologies, as is shown in the embodiments of FIGS. 15 to 17.

Figure 15:
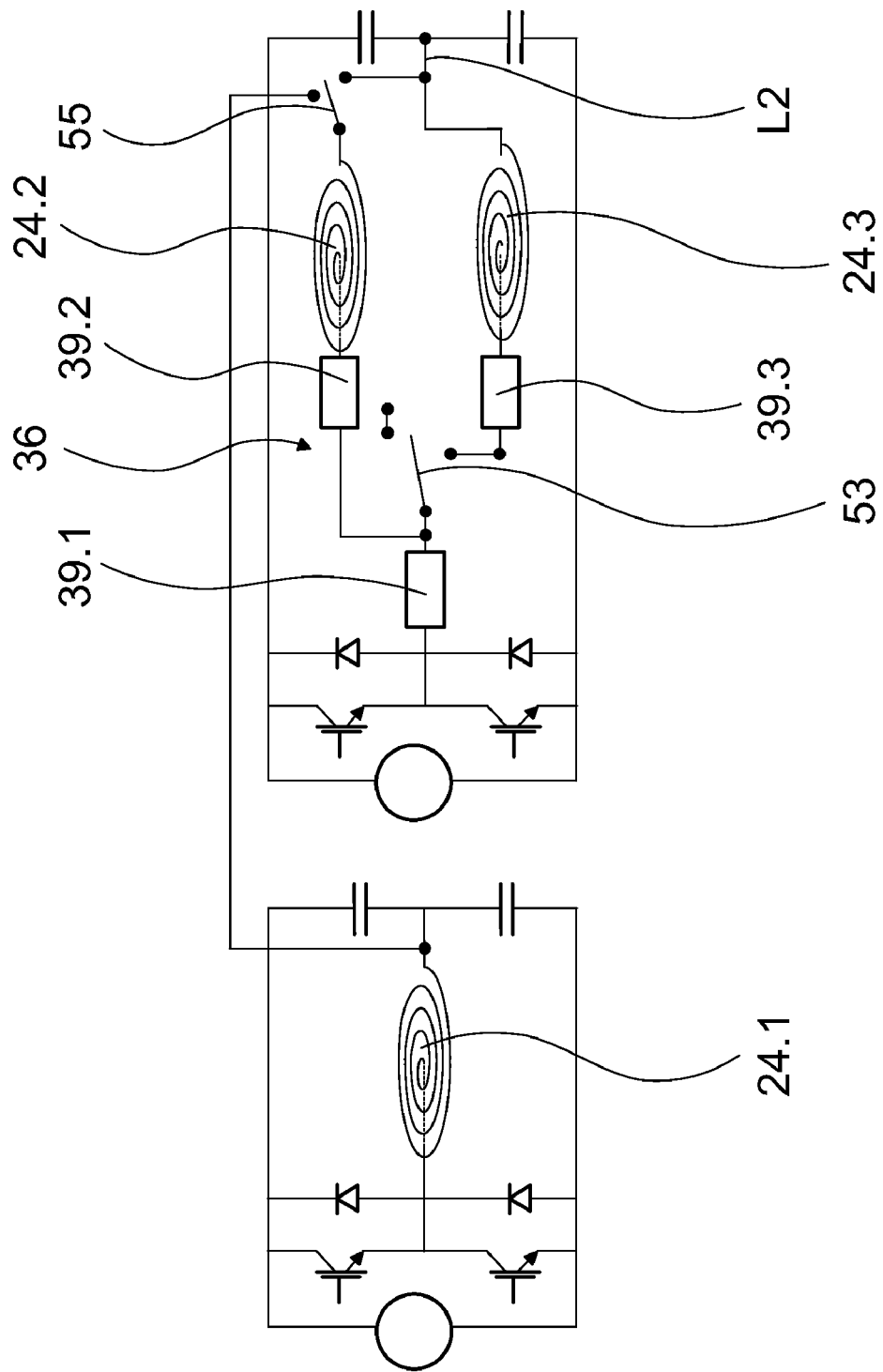

FIG. 15 shows a further embodiment which is oriented towards the topology shown in FIG. 11. The circuit in accordance with FIG. 15 differs from the embodiment in accordance with FIG. 11 by having a further switching means, labeled in the figure with the reference number 55 in the branch assigned to the heating unit 24.2, which is arranged connected downstream from the heating unit 24.2. This switching means 55 serves to switch between the first configurations in which the heating unit 24.2 is connected to the central line L2 and a second configuration in which the heating unit 24.2 is connected to the bridge branch in which the heating unit 24.1 is arranged. The connection to this bridge branch is made via a line which is branched off from the bridge branch, with the branching point being connected downstream from the heating unit 24.1.

Figure 16:
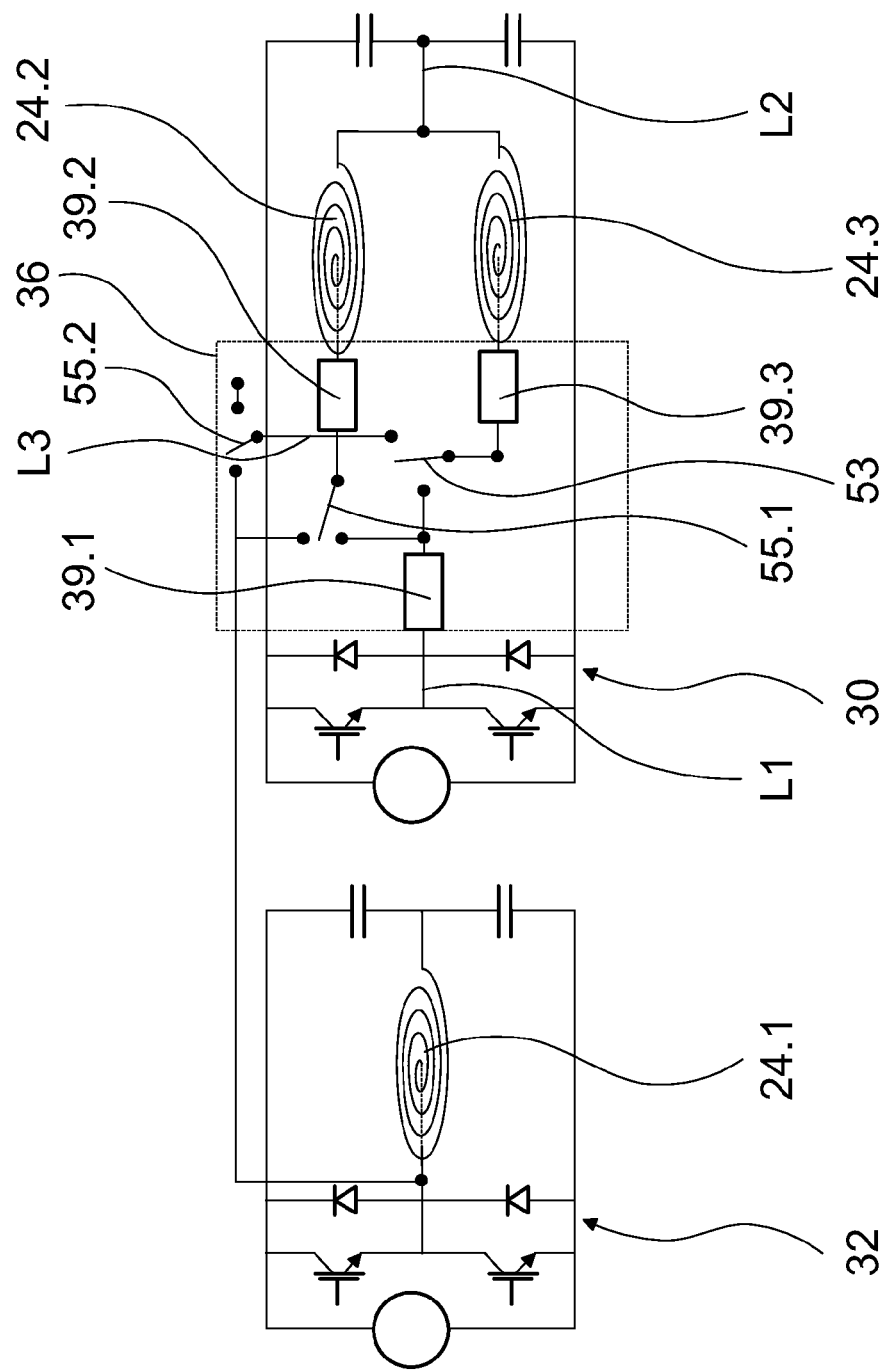

A further embodiment is shown in FIG. 16. This differs from the embodiment in accordance with FIG. 14 in that the functionality of the switching means 53 is different, as well as by having an additional switching means. The switching means 55 of FIG. 14 is labeled in FIG. 16 with the reference number 55.1 while the additional switching means is labeled with the reference number 55.2. The switching means 53 serves to switch between a first configuration in which the heating unit 24.3 is connected to the central line L1 and the second configuration in which the heating unit 24.3 is connected to a connecting line L3. This connecting line L3 connects the switching means 53 to the switching means 55.2. This optionally makes it possible to connect the line L3 to the power unit 32. Interaction of the switching means 53 and 55.2 makes three configurations possible: The heating unit 24.3 is connected via the central line L1 to the power unit 30; the heating unit 24.3 is disconnected from both power units 30, 32 and is switched off by this; the heating unit 24 is connected via the connecting line L3 and the switching means 55.2 to the power unit 32. With the topology shown both heating units 24.2 and 24.3 can optionally be connected to the power unit 30 or to the power unit 32.

Figure 17:
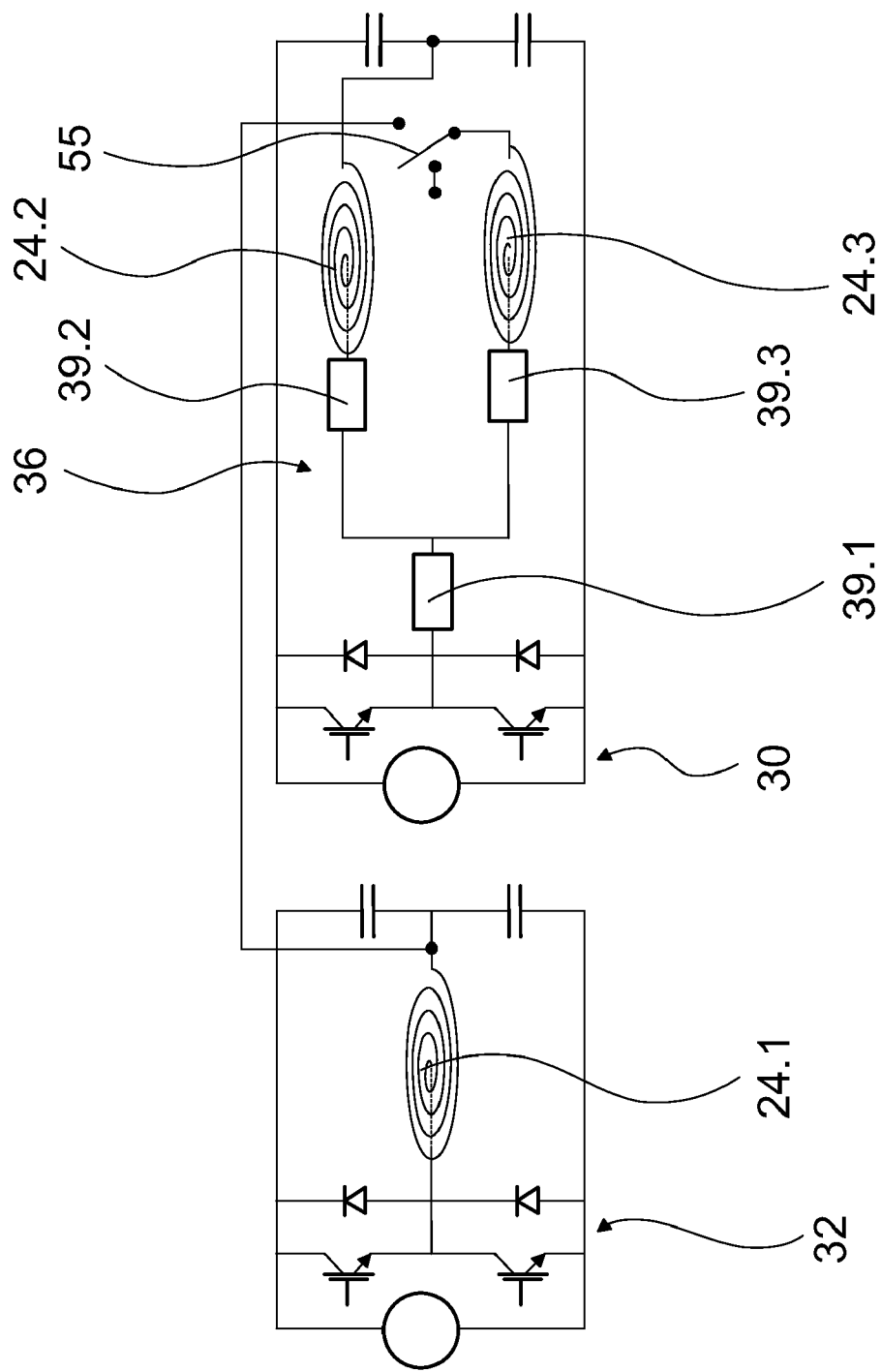

FIG. 17 shows a further embodiment. In this figure the differentiation unit 36 features a single switching means 55 which is connected downstream from the heating unit 24.3. The switching means 55 enables the heating unit 24.3 to either be switched off or it can be connected via a line which is branched off at a branching point connected downstream from the heating unit 24.1 from the bridge branch to this heating unit 24.1. The heating unit 24.2 is permanently connected to the power unit 30.

Figure 18:
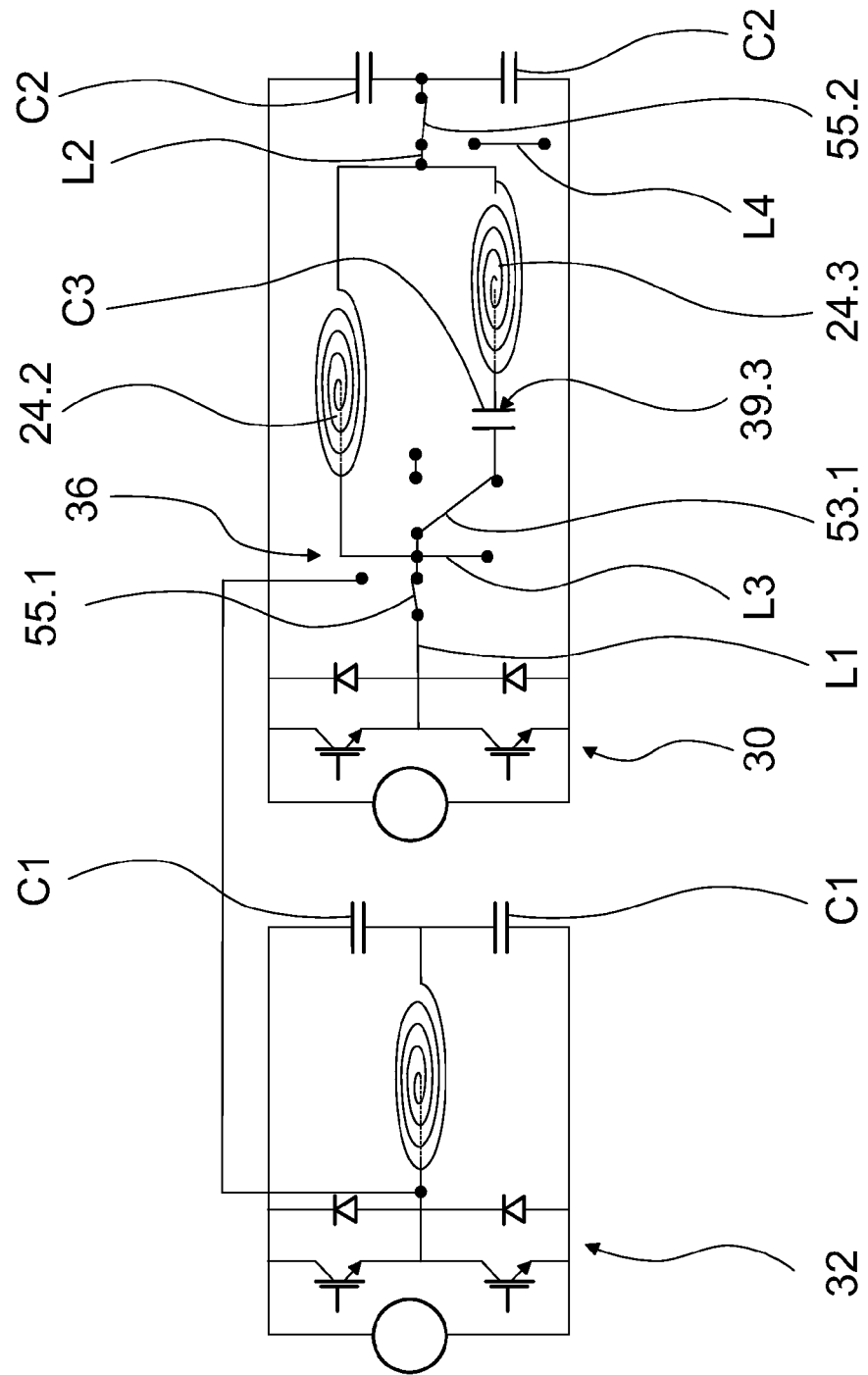

A further alternate embodiment is shown in FIG. 18. The differentiation unit 36 features a differentiation means 39.3 embodied as a capacitor C3 which is arranged in the branch assigned to the heating unit 24.3. In particular the differentiation means 39.3 is connected upstream of the heating unit 24.3. Also arranged in this branch is a switching means 53.1 by means of which the heating unit 24.3 is connected to the central line L1 during the execution of a differentiated heating mode or can be disconnected from the central line L1. Arranged in this central line L1 is a further switching means 55.1. This switching means 55.1 enables a first configuration in which the parallel branches of the heating units 24.2, 24.3 are connected to the power unit 30 and a second configuration to be achieved in which the heating unit 24.1 is connected to the power units 30 and 32 and can be supplied with power by the latter. Branched off from the central line is a connecting line L3 with which a connection can be established to a circuit 54 shown in FIG. 19 via a switching means 53.2 arranged in the line L3 and shown in FIG. 19. A switching means 55.2 is likewise arranged in the central line L2. Optionally the heating units 24.2, 24.3 can be connected by means of switching means 55.2 either to the capacitor branch featuring the capacitors C2 or to a further connecting line L4 by means of which a connection can be established to a circuit 54 shown in FIG. 19, as is shown in FIG. 19.

FIG. 18 shows the circuit in a differentiated heating mode with all the heating units 24.1 to 24.3, with this heating mode being embodied as a so-called "nominal" heating mode in which the powers output to the heating units 24 are limited by the nominal powers of the power units 30, 32. In this heating mode the heating units 24.2, 24.3 supplied by means of the configurations of the switching means 53.1, 53.2, 55.1, 55.2 by the power unit in a standard bridge in configuration with power, with the subcircuits with the power units 30, 32 being disconnected from each other.

Figure 19:
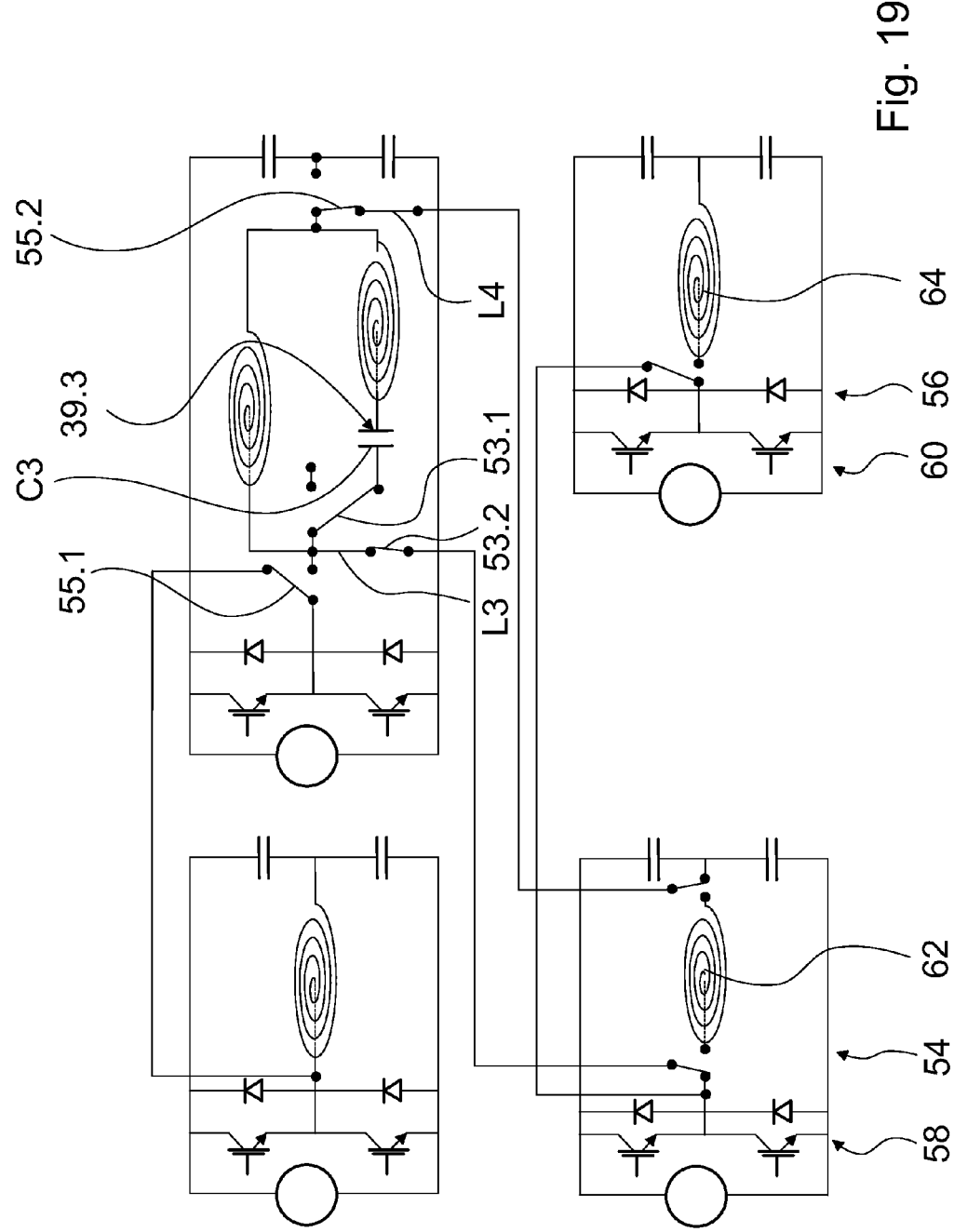

FIG. 19 shows the circuit as well as to further circuits 54, 56 during execution of a differentiated heating mode with all the heating units 24.1 to 24.3 with this heating mode being embodied as a so-called "superboost" heating mode. In this heating mode of the heating units 24.2, 24.3 connected to further power units 58, 60 of the circuit 54, 56, whereas to supply the heating units 24.1 both power units 30, 32 are included. This means that in this heating mode a higher power than in nominal heating mode can be achieved. The circuits 54, 56 feature further heating unit 62, 64 which are unused during execution of the "superboost" heating mode, as well as power units 58, 60 for supplying these heating units 62, 64, with the heating units 62, 64 being disconnected from their respectively assigned power unit 58 or 60 by means of switching means and these power units 58, 60 serving to supply the heating units 24.2, 24.3.

Figure 20:
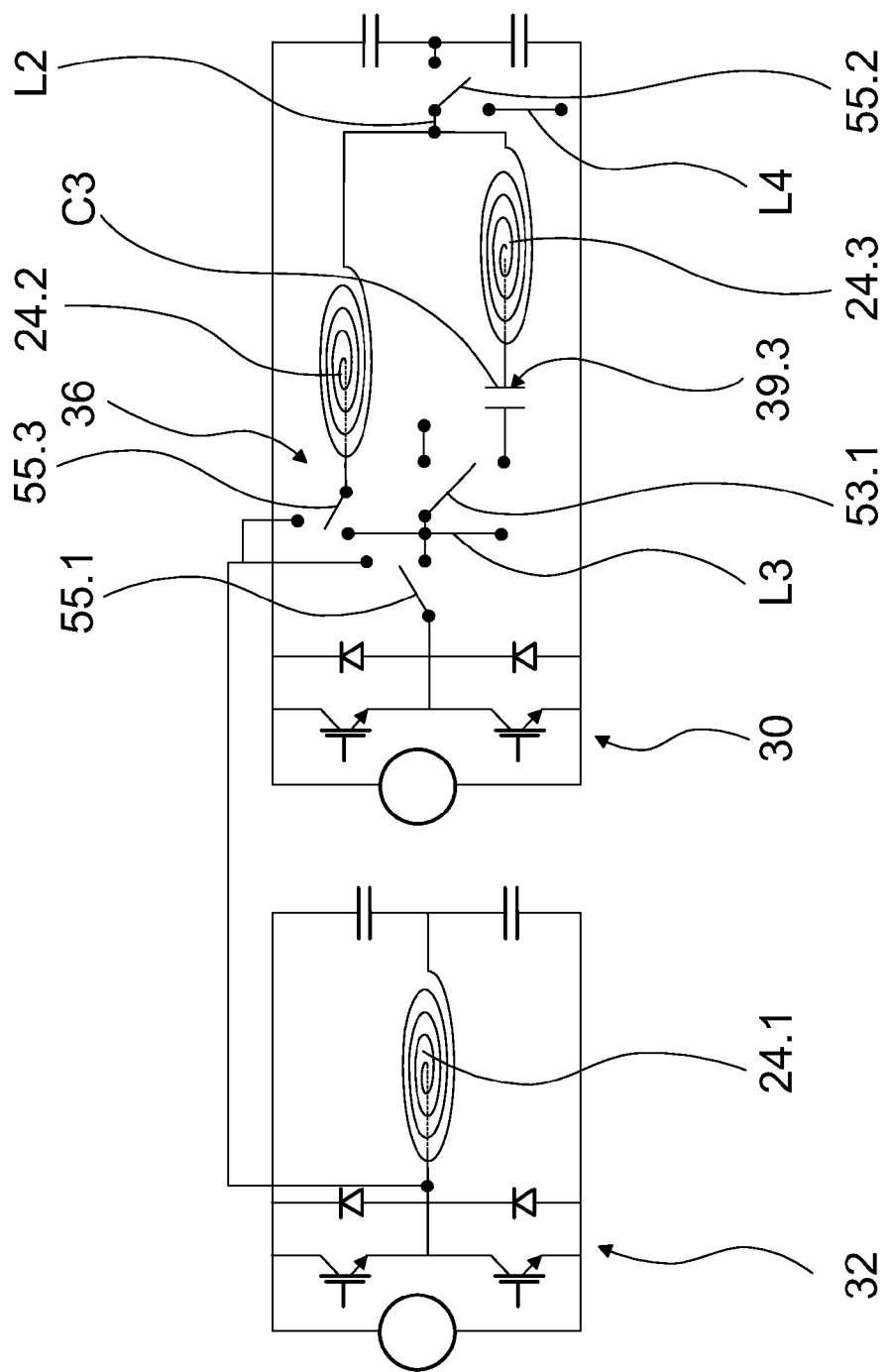

A variant of the embodiment from FIG. 18 is shown in FIG. 20. By comparison with the embodiment in accordance with FIG. 18, a further switching means 55.3 is arranged in the branch assigned to the heating unit 24.2 connected upstream from the heating unit 24.2. This optionally connects the heating unit 24.2 to the central line L1 or connects the heating unit 24.2 to the power unit 32 via a line branched off in the bridge branch of the heating unit 24.1 before the heating unit 24.1. With this circuit, as described above, a "nominal" and a "superboost" heating mode can be executed.

Figure 21:
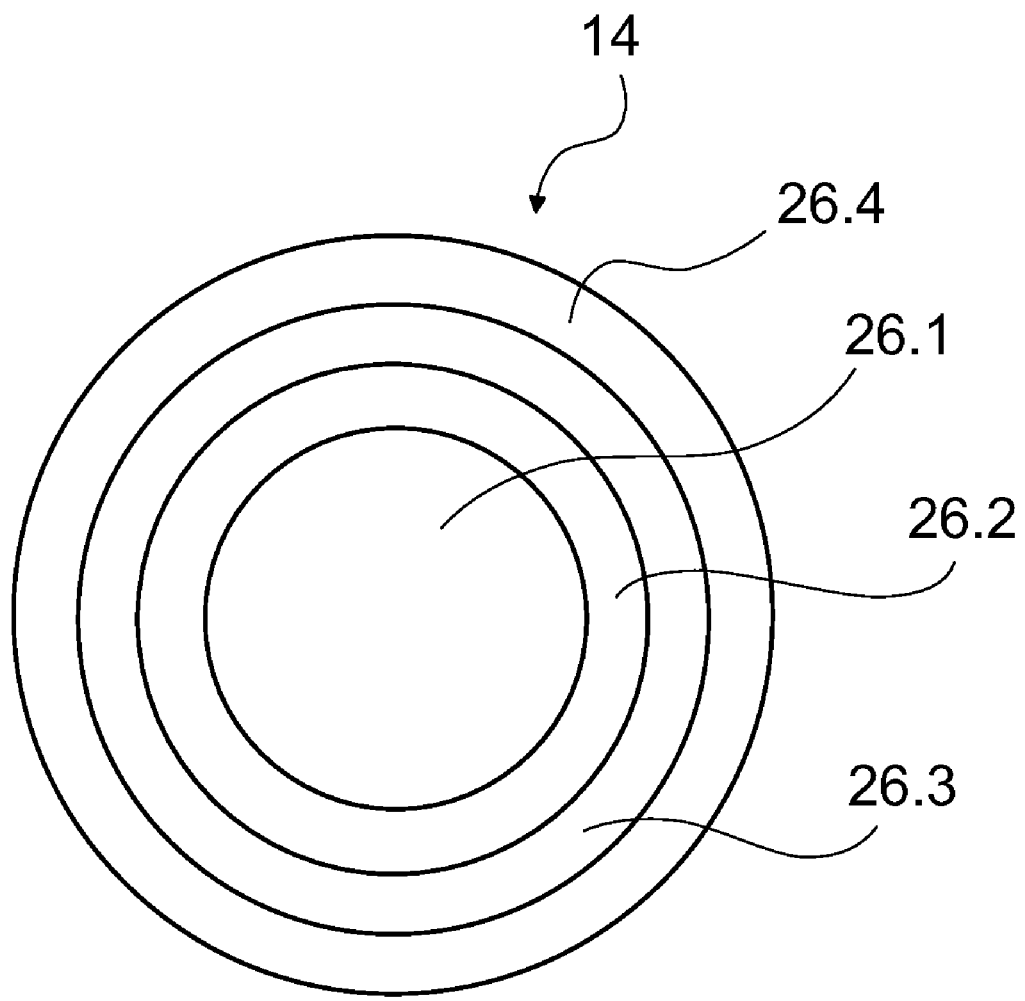

FIG. 21 shows an alternate embodiment variant of the cooking zone 14. This comprises the concentric cooking areas 26.1 to 26.3 described above. In addition the cooking zone 14 features a further cooking area 26.4 which is concentric to the other cooking areas 26.1 to 26.3 and surrounds these areas. This cooking area 26.4 covers a heating unit 24.4 not shown in any greater detail in FIG. 21 which surrounds the further heating units 24.1 to 24.3 below the cooktop 12. In this embodiment the heating unit 24.4 is embodied as the outermost heating unit and the heating units 24.2 and 24.3 are considered as intermediate heating units. Circuits including different embodiments of these heating units 24.1 to 24.4 are shown in FIGS. 22 to 25.

Figure 22:
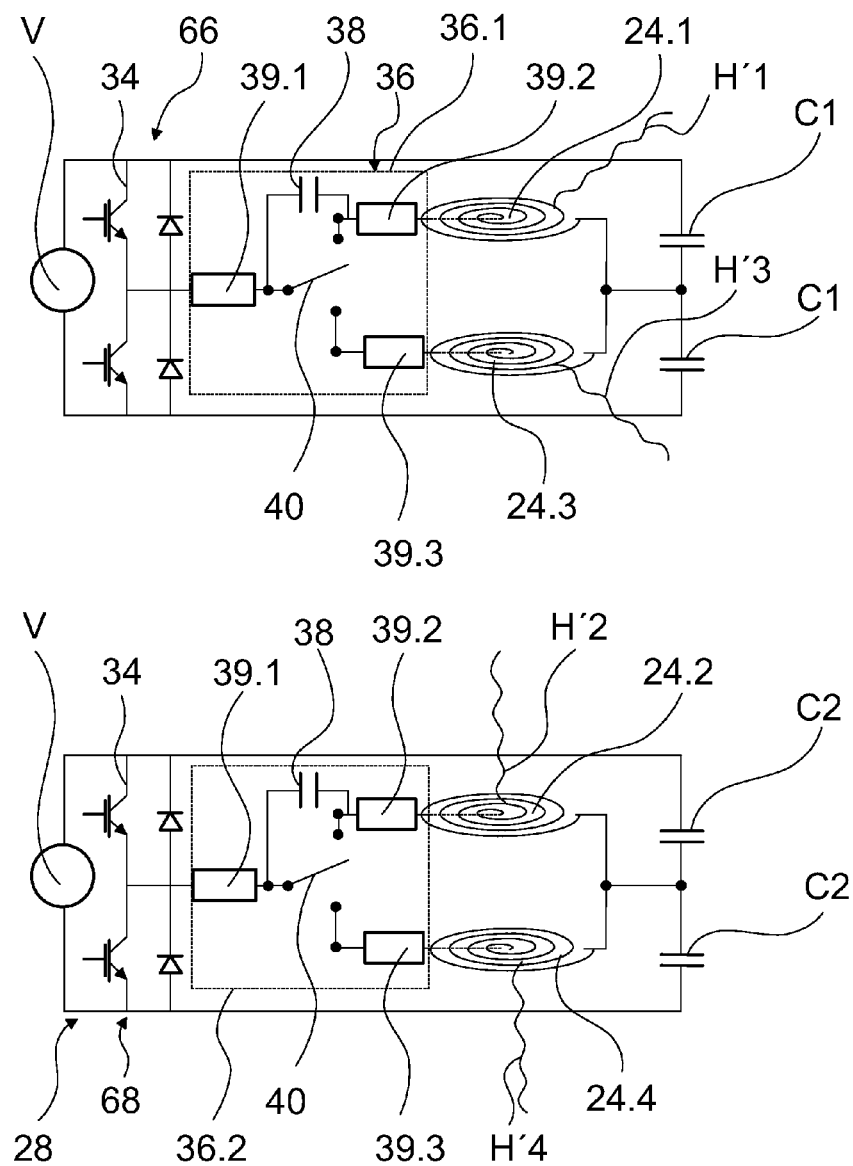

FIG. 22 shows a first embodiment of a circuit featuring the heating units 24.1 to 24.4. Assigned to these are two power units 66, 68 which form the power device 28. In this embodiment heating units spaced apart from each other are assigned to a common power unit. The central heating unit 24.1 and the intermediate heating unit 24.3 are supplied with power by the power unit 66, while the intermediate heating unit 24.3 and the outermost heating unit 24.4. are supplied with power by the power unit 68. The power units 66, 68 each feature a pair of switching elements 34. The subcircuit which comprises the power unit 66 and the heating units 24.1, 24.3 has a topology which corresponds to the embodiment of the subcircuit assigned to the heating units 24.2, 24.3 in accordance with FIG. 3. In this case the heating units 24.1, 24.3 are arranged in a bridge branch which adjoins a capacitor branch with two capacitors C1. The other subcircuit which comprises the power unit 68 and the heating unit 24.2, 24.4 has an identical topology. The values of the functional components in the subcircuits can be identical or different. The power device 28 features a differentiation unit 36. This is divided into two part differentiation units 36.1, 36.2. These part differentiation units 36.1, 36.2 are each arranged in a bridge branch of the subcircuits and each correspond in their embodiment to the topology of the differentiation unit from FIG. 3.

By means of the differentiation unit 36, based on the functional principle of the part differentiation units 36.1, 36.2, which will not be reiterated here, two different heating modes can be achieved. A first differentiated heating mode with three heating units 24.1, 24.2, 24.3 can be operated in which the central heating unit 24.1 and the innermost intermediate heating unit 24.2 will be operated with a heating power H'1 or H'2 and the outermost intermediate heating unit 24.3 will be operated with a heating power H'3 which is greater than the heating powers H'1, H'2. These powers H'1, H'2 can be identical or can differ from one another. This is governed by the dimensioning of the differentiation means 39.1 to 39.3 in the respective part differentiation units 36.1, 36.2. In this first differentiated heating mode the outermost heating unit 24.4 remains switched off through corresponding configuration of the switching means 40 of the part differentiation unit 36.2. A further differentiated heating mode with four heating units 24.1 to 24.4 can also be operated. To do this the switching means 40 of the part differentiation units 36.2 is actuated so that the outermost heating unit 24.4 is connected to the power unit 68. In this differentiated heating mode the heating unit 24.4 is operated with a heating power H'4 which is greater than the heating powers H'1, H'2. The heating powers H'3 and H'4 can be identical or can differ from one another. This is governed by the choice of the dimensioning of the differentiation means 39.1 to 39.3 in the respective part differentiation units 36.1, 36.2. For example the values of the functional modules of the parts differentiation units 36.1, 36.2 in the subcircuits can be identical while the values of the capacitors C1 are advantageously different in the subcircuits. The outermost heating unit 24.4 is switched on using the same procedure as for the heating unit 24.3 by means of a sensor means not shown in any greater detail for detecting a coverage state of the heating unit 24.4 and in collaboration with the sensor unit 50 which actuates the switching means 40 of the part differentiation unit 36.2.

Figure 23:
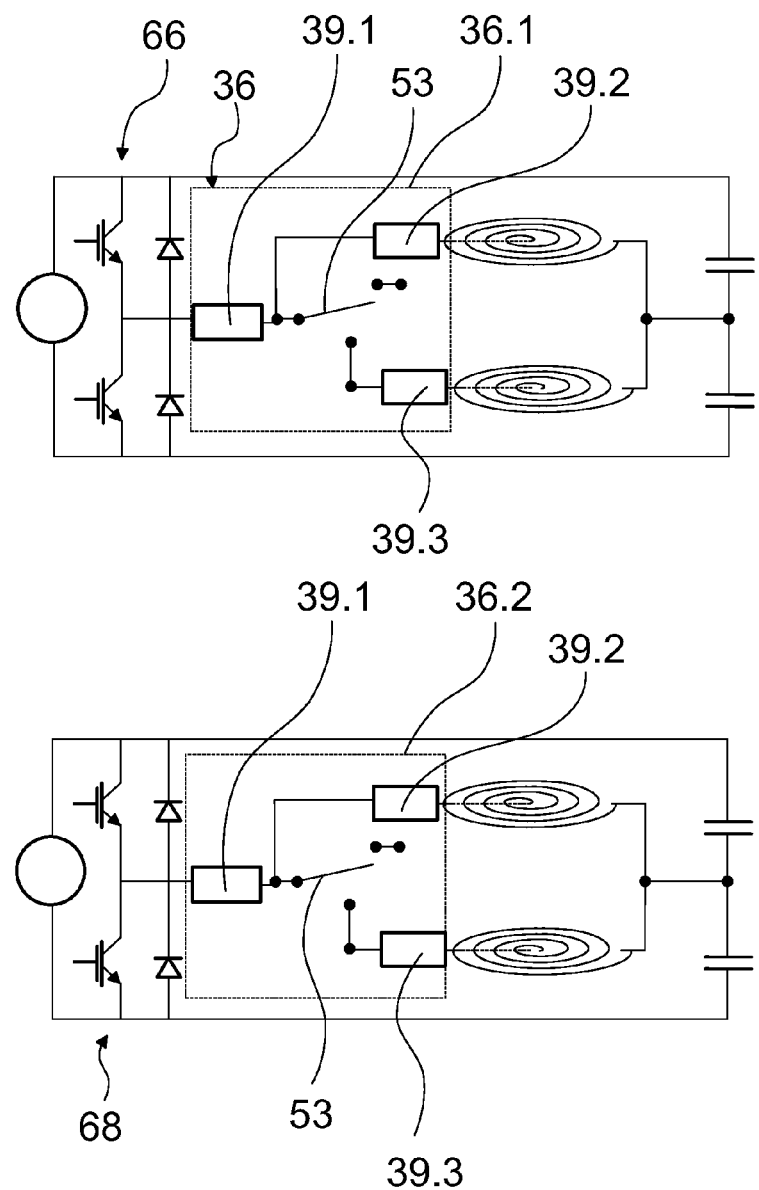
Figure 24:
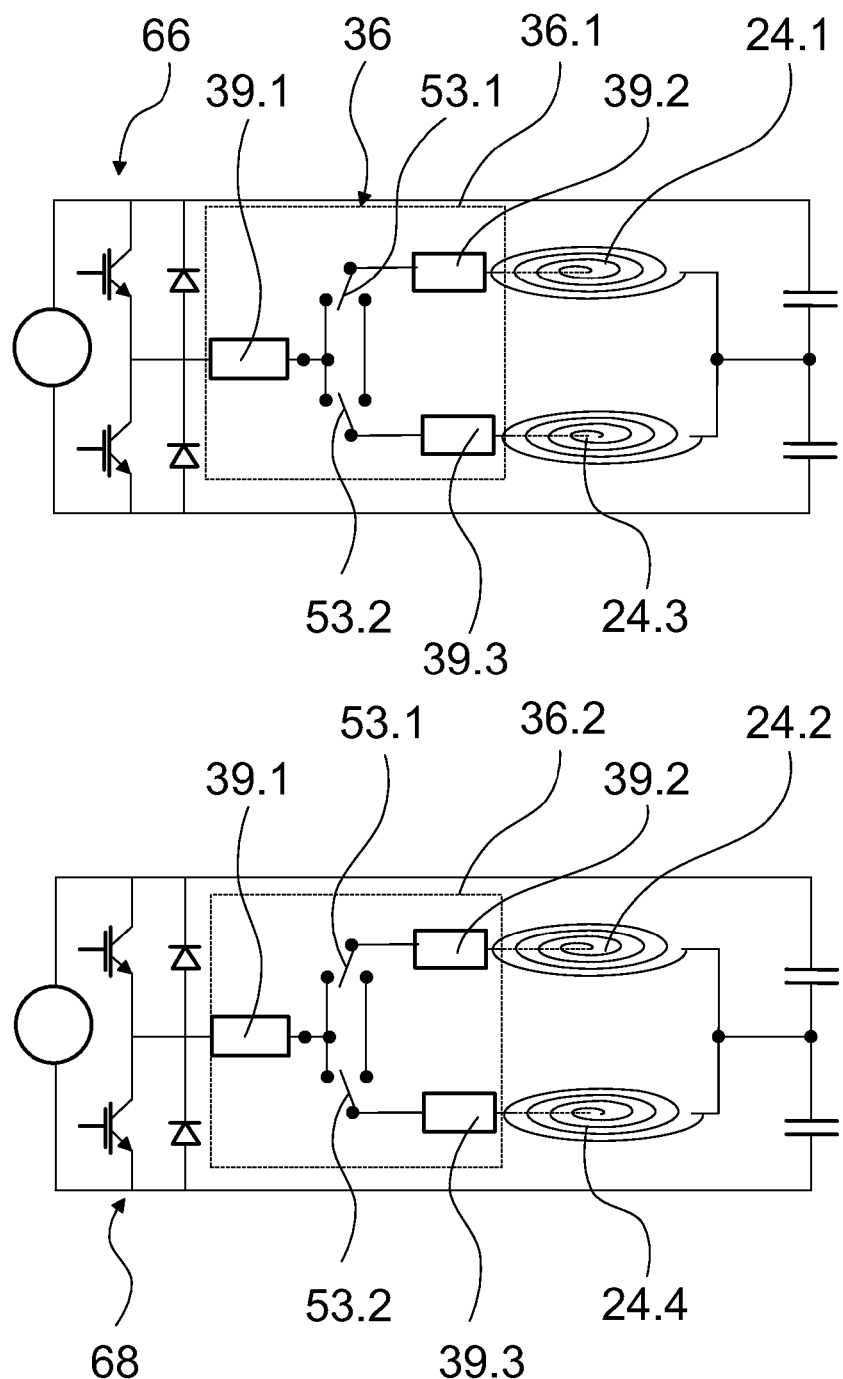
Figure 25:
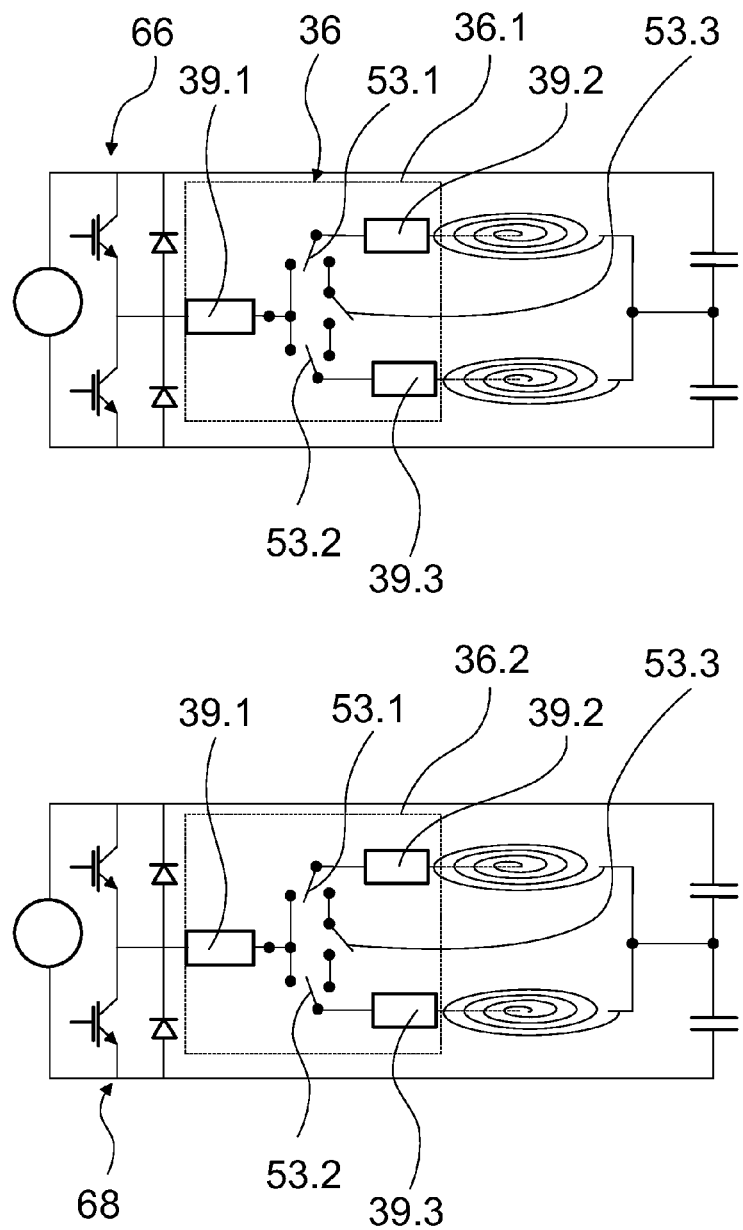

The circuits shown in FIGS. 23 to 25 differ from the embodiment depicted in FIG. 22 through the embodiment of the part differentiation units 36.1, 36.2.

In FIG. 23 the subcircuits are provided with a part differentiation unit 36.1, 36.2 which corresponds to the embodiment of the differentiation unit 36 in accordance with FIG. 11. In FIG. 24 the part differentiation units 36.1, 36.2 are embodied in accordance with the embodiment from FIG. 12, whereas the use of part differentiation units 36.1, 36.2 in accordance with the embodiment from FIG. 13 is shown in FIG. 25.

| List of reference signs | |
|---|---|
| 10 | Cooking device |
| 12 | Cooktop |
| 14 | Cooking zone |
| 16 | Cooking zone |
| 18 | Cooking zone |
| 20 | Cooking zone |
| 22 | Operating unit |
| 24 | Heating unit |
| 26 | Cooking area |
| 28 | Power device |
| 30 | Power unit |
| 32 | Power unit |
| 34 | Switching element |
| 36 | Differentiation unit |
| 36.1 | Part differentiation unit |
| 36.2 | Part differentiation unit |
| 38 | Differentiation means |
| 39 | Differentiation means |
| 40 | Switching means |
| 42 | Branch |
| 44 | Capacitor |
| 46 | Food preparation vessel |
| 48 | Food preparation vessel |
| 50 | Control unit |
| 52 | Sensor means |
| 53 | Switching means |
| 54 | Circuit |
| 55 | Switching means |
| 56 | Circuit |
| 58 | Power unit |
| 60 | Power unit |
| 62 | Heating unit |
| 64 | Heating unit |
| 66 | Power unit |
| 68 | Power unit |
| H1 | Heating power |
| H'1 | Heating power |
| H2 | Heating power |
| H'2 | Heating power |
| H'3 | Heating power |
| H'4 | Heating power |
| L1, L2 | Central line |
| L3, L4 | Connecting line |
| C1, | Capacitor |
| C2, | Capacitor |
| C3, | Capacitor |
| $C_{med}$ | Capacitor |
| V | Voltage |

The invention claimed is:

1. A cooktop comprising:
a plurality of heaters that form a contiguous cooking zone;
a power supply for the plurality of heaters with a differentiator that differentiates between a first positive heating power for a first of the plurality of heaters and a second positive heating power for a second of the plurality of heaters in a differentiated heating mode.

2. The cooktop of claim 1, wherein the plurality of heaters includes three heaters and the differentiated heating mode is a heating mode with three heaters.

3. The cooktop of claim 2, wherein the three heaters are concentric to each other and wherein the differentiator differentiates between a first positive heating power for a first outer heater and the second positive heating power for a second outer heater.

4. The cooktop of claim 3, wherein the power supply supplies an intermediate of the three heaters with a smallest positive heating power.

5. The cooktop of claim 1, wherein the power supply comprises:
a first power supply for two of the plurality of heaters; and
a second power supply for a third of the plurality of heaters.

6. The cooktop of claim 5, wherein the first power unit supplies power simultaneously to the two heaters.

7. The cooktop of claim 5, wherein the plurality of heaters comprises three concentrically arranged heaters and wherein the first power supply supplies power to the two outer heaters.

8. The cooktop of claim 5, wherein the first power supply supplies differentiated positive heating power for the two of the plurality of heaters in the differentiated heating mode.

9. The cooktop of claim 5, wherein the differentiator comprises a switch that connects one of the plurality of heaters to one of the first power supply and the second power supply in the differentiated heating mode.

10. The cooktop of claim 1, wherein the differentiator predetermines a fixed ratio between the first positive heating power and the second positive heating power in the differentiated heating mode.

11. The cooktop of claim 1, wherein the differentiator comprises a capacitor.

12. The cooktop of claim 1, wherein the differentiator is connected in series with one of the plurality of heaters in the differentiated heating mode.

13. The cooktop of claim 1, wherein the differentiator comprises a differentiation means and a switch that switches the differentiation means on and off.

14. The cooktop of claim 13, wherein the differentiation means is in a branch which bridges the switch.

15. The cooktop of claim 13, wherein the differentiator comprises another differentiation means connected upstream of the switch.

* * * * *